(12) United States Patent
Addison et al.

(10) Patent No.: US 10,427,692 B2
(45) Date of Patent: Oct. 1, 2019

(54) VEHICLE CONTROL MODULE WITH SIGNAL SWITCHBOARD AND INPUT TABLES

(71) Applicant: Crown Equipment Corporation, New Bremen, OH (US)

(72) Inventors: Mark E. Addison, Ludlow Falls, OH (US); Walter Conley, III, New Bremen, OH (US); Karl L. Dammeyer, St. Marys, OH (US); Joe K. Hammer, St. Marys, OH (US); Stephen T. Mangette, Delphos, OH (US)

(73) Assignee: Crown Equipment Corporation, New Bremen, OH (US)

( * ) Notice: Subject to any disclaimer, the term of this patent is extended or adjusted under 35 U.S.C. 154(b) by 553 days.

(21) Appl. No.: 15/219,350

(22) Filed: Jul. 26, 2016

(65) Prior Publication Data

US 2017/0028993 A1    Feb. 2, 2017

Related U.S. Application Data

(60) Provisional application No. 62/197,836, filed on Jul. 28, 2015, provisional application No. 62/197,857, filed on Jul. 28, 2015.

(51) Int. Cl.
*B60W 50/06* (2006.01)
*G05B 19/042* (2006.01)
(Continued)

(52) U.S. Cl.
CPC ............ *B60W 50/06* (2013.01); *B60W 10/20* (2013.01); *B60W 10/30* (2013.01); *B66F 9/24* (2013.01);
(Continued)

(58) Field of Classification Search
None
See application file for complete search history.

(56) References Cited

U.S. PATENT DOCUMENTS 4,084,240 A    4/1978  Lappington
4,128,900 A   12/1978  Lappington
(Continued)

FOREIGN PATENT DOCUMENTS

CN        1519745 A    8/2004
CN      101137533 A    3/2008
(Continued)

OTHER PUBLICATIONS

Weeks, Martin; Office Action; U.S. Appl. No. 15/219,367; dated Jan. 30, 2018; United States Patent and Trademark Office; Alexandria, VA.

(Continued)

*Primary Examiner* — Lail A Kleinman
(74) *Attorney, Agent, or Firm* — Stevens & Showalter, L.L.P.

(57) ABSTRACT

A module capable of operating on one of first and second vehicles includes an input table having a superset of input elements, with a first subset of input elements related to a first set of hardware devices on the first vehicle and a second subset related to a second set of hardware devices on the second vehicle. The module includes at least one configuration table with configuration elements corresponding to ones of the superset of input elements, wherein each configuration element has data related to transforming a value associated with an input element. The module includes vehicle function input elements related to function inputs utilized on the vehicles; and structure for determining a value of an input element corresponding to a function input element, transforming the value to a transformed value and (Continued)

linking the transformed value with the corresponding function input element.

72 Claims, 11 Drawing Sheets

(51) Int. Cl.
| | |
|---|---|
| *G06F 8/60* | (2018.01) |
| *H04L 12/751* | (2013.01) |
| *G05B 19/04* | (2006.01) |
| *G06F 9/30* | (2018.01) |
| *B60W 10/30* | (2006.01) |
| *B60W 10/20* | (2006.01) |
| *B66F 9/24* | (2006.01) |
| *G05D 1/02* | (2006.01) |
| *B60W 50/00* | (2006.01) |

(52) U.S. Cl.
CPC .......... *G05B 19/04* (2013.01); *G05B 19/042* (2013.01); *G05D 1/0231* (2013.01); *G06F 8/60* (2013.01); *G06F 9/30007* (2013.01); *H04L 45/02* (2013.01); *B60W 2050/0077* (2013.01); *B60W 2050/0082* (2013.01); *B60W 2300/121* (2013.01); *G05B 2219/2641* (2013.01)

(56) References Cited

U.S. PATENT DOCUMENTS

| | | | |
|---|---|---|---|
| RE31,997 | E | 10/1985 | Klötzner |
| 4,556,943 | A | 12/1985 | Pauwels et al. |
| 5,056,026 | A | 10/1991 | Mitchell et al. |
| 5,113,344 | A | 5/1992 | Kellogg et al. |
| 5,200,900 | A | 4/1993 | Adrain et al. |
| 5,247,446 | A | 9/1993 | Motz et al. |
| 5,293,317 | A | 3/1994 | Adrain et al. |
| 5,394,327 | A | 2/1995 | Simon, Jr. et al. |
| 5,446,665 | A | 8/1995 | Adrian et al. |
| 5,473,540 | A | 12/1995 | Schmitz |
| 5,490,064 | A | 2/1996 | Minowa et al. |
| 5,523,948 | A | 6/1996 | Adrain |
| 5,638,272 | A | 6/1997 | Minowa et al. |
| 5,794,165 | A | 8/1998 | Minowa et al. |
| 5,826,211 | A | 10/1998 | Kobayashi |
| 5,832,397 | A | 11/1998 | Yoshida et al. |
| 6,009,370 | A | 12/1999 | Minowa et al. |
| 6,240,340 | B1 | 5/2001 | Minowa et al. |
| 6,269,300 | B1 | 7/2001 | Moore-McKee et al. |
| 6,591,167 | B1 | 7/2003 | Minowa et al. |
| 6,952,642 | B1 | 10/2005 | Cowen |
| 6,978,198 | B2 | 12/2005 | Shi |
| 6,999,869 | B1 | 2/2006 | Gitlin et al. |
| 7,130,723 | B2 | 10/2006 | Minowa et al. |
| 7,506,097 | B2 | 3/2009 | Ferguson et al. |
| 7,590,768 | B2 | 9/2009 | Gormley |
| 7,653,462 | B2 | 1/2010 | Minowa et al. |
| 7,798,128 | B2 | 9/2010 | Bellistri et al. |
| 7,870,223 | B2 | 1/2011 | Grgic et al. |
| 7,899,610 | B2 | 3/2011 | McClellan |
| 7,996,140 | B2 | 8/2011 | Stewart et al. |
| 8,060,290 | B2 | 11/2011 | Stewart et al. |
| 8,265,854 | B2 | 9/2012 | Stewart et al. |
| 8,346,430 | B2 | 1/2013 | Przymusinski et al. |
| 8,478,506 | B2 | 7/2013 | Grichnik et al. |
| 8,494,750 | B2 | 7/2013 | Wyatt et al. |
| 8,688,361 | B2 | 4/2014 | Herz et al. |
| 8,708,349 | B1 | 4/2014 | Setzer, Sr. et al. |
| 8,943,467 | B2 | 1/2015 | Esfahan et al. |

| | | | |
|---|---|---|---|
| 2005/0017851 | A1* | 1/2005 | Allison ............ G08G 1/017 340/425.5 |
| 2007/0050088 | A1 | 3/2007 | Murray, IV et al. |
| 2009/0113186 | A1 | 4/2009 | Kato et al. |
| 2010/0228428 | A1 | 9/2010 | Harshbarger et al. |
| 2011/0022545 | A1 | 1/2011 | Durney |
| 2012/0035815 | A1 | 2/2012 | Kawashima et al. |
| 2012/0123614 | A1 | 5/2012 | Laws et al. |
| 2012/0126000 | A1 | 5/2012 | Kunzig et al. |
| 2012/0185121 | A1 | 7/2012 | Umehara et al. |
| 2014/0068099 | A1 | 3/2014 | Komori |
| 2014/0188324 | A1 | 7/2014 | Waltz et al. |
| 2014/0359180 | A1 | 12/2014 | Aue et al. |
| 2015/0081194 | A1 | 3/2015 | Debelak et al. |
| 2015/0283993 | A1 | 10/2015 | Takano et al. |
| 2017/0291501 | A1 | 10/2017 | Takahashi et al. |

FOREIGN PATENT DOCUMENTS

| | | |
|---|---|---|
| CN | 103842926 A | 6/2014 |
| CN | 103946830 A | 7/2014 |
| DE | 3306463 A1 | 9/1984 |
| DE | 10101311 A1 | 8/2002 |
| DE | 10318470 A1 | 7/2004 |
| DE | 102004018384 A1 | 11/2005 |
| DE | 102004044778 A1 | 4/2006 |
| DE | 102004055875 A1 | 5/2006 |
| DE | 69927651 T2 | 6/2006 |
| DE | 112009000155 T5 | 12/2010 |
| DE | 102012202931 A1 | 9/2012 |
| DE | 102013210064 A1 | 12/2014 |
| DE | 102013210077 A1 | 12/2014 |
| DE | 102013210182 A1 | 12/2014 |
| EP | 0615885 A1 | 9/1994 |
| EP | 0636955 A1 | 2/1995 |
| EP | 0987424 A2 | 3/2000 |
| EP | 1136325 A2 | 9/2001 |
| EP | 1034982 A3 | 12/2003 |
| EP | 1384641 A1 | 1/2004 |
| EP | 1282842 B1 | 6/2005 |
| EP | 1672322 A2 | 6/2006 |
| EP | 1703391 A2 | 9/2006 |
| EP | 1509992 B1 | 10/2007 |
| EP | 2088048 A1 | 8/2009 |
| EP | 1666327 B1 | 8/2010 |
| EP | 2333631 A2 | 6/2011 |
| EP | 2628706 A1 | 8/2013 |
| EP | 2775363 A2 | 9/2014 |
| WO | 2011040841 A1 | 4/2011 |
| WO | 2014099886 A1 | 6/2014 |

OTHER PUBLICATIONS

Weeks, Martin A.; Notice of Allowance; U.S. Appl. No. 15/219,367; dated Jul. 20, 2018; United States Patent and Trademark Office; Alexandria, VA.

Ozsoy, Sevda; International Search Report and Written Opinion of the International Search Authority; International Application No. PCT/US2016/043977; dated Nov. 22, 2016; European Patent Office; Rijswijk, Netherlands.

Ozsoy, Sevda; International Search Report and Written Opinion of the International Search Authority; International Application No. PCT/US2016/043981; dated Dec. 6, 2016; European Patent Office; Rijswijk, Netherlands.

Mark E. Addison, Walter Conley, Karl L. Dammeyer, Joe K. Hammer and Stephen T. Mangette; Specification and Drawings; U.S. Appl. No. 15/219,367, filed Jul. 26, 2016.

Tian Shaoxu; First Office Action; Chinese Patent Application No. 201680037493.3; dated Jan. 2, 2019; State Intellectual Property Office of the People's Republic of China.

* cited by examiner

VEHICLE CONTROL MODULE WITH SIGNAL SWITCHBOARD AND INPUT TABLES

RELATED APPLICATION

This application is related to and claims the benefit of provisional patent applications entitled "Vehicle Control Module with Signal Switchboard", Application Ser. No. 62/197,836 and "Vehicle Control Module with Signal Switchboard and Tables", Application Ser. No. 62/197,857 both filed Jul. 28, 2015, the disclosures of which are incorporated by reference herein in their entirety. This application is related to an application entitled "Vehicle Control Module with Signal Switchboard and Output Tables," which is being filed concurrently herewith, Ser. No. 15/219,367 and is incorporated by reference herein.

FIELD OF THE INVENTION

The present invention relates generally to operation of a materials handling vehicle, and, more particularly, to software-based control of the materials handling vehicle.

BACKGROUND OF THE INVENTION

Forklifts and other types of industrial vehicles are expected to operate under a variety of different conditions. Further, such vehicles typically include a number of different functional systems such as a traction system to control a travelling speed of the vehicle and a steering system to control a direction in which the vehicle travels. There are a wide variety of vehicles having different hardware sensors, inputs, and outputs. Furthermore, the different types of vehicles may also have different functional systems emulated or simulated by software. For example, vehicles on which a driver sits may have different functions than those for a vehicle where the operator walks alongside. Accordingly, each vehicle type typically has its own control systems that are designed specifically for the hardware devices present on the vehicle and the specific functional systems that are appropriate for the particular vehicle.

BRIEF SUMMARY OF THE INVENTION

Aspects of the present invention relate to a computer-based vehicle control module capable of operating on one of first and second materials handling vehicles. The module can include a) a module input table comprising a superset of module input elements, wherein the superset of module input elements comprises a first subset of input elements related to a first set of hardware devices provided on the first vehicle and a second subset of module input elements related to a second set of hardware devices provided on the second vehicle; b) at least one configuration table comprising respective configuration elements corresponding to ones of the superset of module input elements, wherein each respective configuration element comprises data related to effect a transformation of a value associated with the corresponding module input element of the module input table; and c) vehicle function input elements related to vehicle function inputs utilized on the first vehicle and the second vehicle. The module can also include computer-based structure for determining a value associated with a module input element of the module input table corresponding to a vehicle function input element, transforming the value to a transformed value and linking the transformed value with the corresponding vehicle function input element.

As an example, the hardware devices implemented on the one of the first and the second vehicles comprise one or more of: a bus of a vehicle network; an encoder; a switch; an analog sensor; and a digital sensor.

In particular, the computer-based structure can include a routing table comprising entries related to: a) associated vehicle function input elements, and b) associated module input elements of one of the first and second subsets of module input elements corresponding to one of the first and the second vehicle on which the vehicle control module is operating. Furthermore, determining the value associated with a module input element can include a) determining the module input element associated with the vehicle function input element that is associated with the entry, and b) determining the value associated with the corresponding module input element of the module input table. Accordingly, the module can include a computer accessible memory wherein each element of the module input table comprises a respective address in the memory where its associated value is stored.

In accordance with one aspect of the present invention, the vehicle control module can include a module input data structure comprising a superset of module input variables, wherein the superset of module input variables comprises a first subset of module input variables related to the first set of hardware devices provided on the first vehicle and a second subset of module input variables related to the second set of hardware devices provided on the second vehicle; and wherein each module input element corresponds to one of the superset of module input variables and comprises an offset amount of the corresponding module input variable within the module input data structure.

As a result, the computer-based structure can include a routing table comprising entries related to: a) associated vehicle function input elements, and b) associated module input elements of one of the first and second subsets of module input elements corresponding to one of the first and the second vehicle on which the vehicle control module is operating. Determining the value associated with a module input element comprises: a) determining the module input element associated with the vehicle function input element that is associated with the entry, b) determining an address of the module input data structure, c) constructing a composite address based on the module input element and the address of the module input data structure, and d) determining a value associated with the composite address.

Also, the at least one configuration table of the module can include a module input configuration table comprising respective module input configuration elements corresponding to ones of the superset of module input elements, wherein each respective module input configuration element comprises data to effect a first transformation related to the value associated with the corresponding module input element of the module input table. Furthermore, the at least one configuration table can also include a function input configuration table comprising respective function input configuration elements corresponding to ones of the vehicle function input elements, wherein each respective function input configuration element comprises data to effect a second transformation related to the value associated with the corresponding module input element of the module input table. As a result, transforming the value to the transformed value can include determining the transformed value based on the first transformation and the second transformation.

The transformation of the value comprises one or more of: leave the value unchanged; bitmask the value; bit-shift the value; add a predetermined offset to the value; and multiply the value by a predetermined gain. Also, each element of the module input configuration table can comprise data related to a data type of the value associated with the corresponding module input element of the module input table and each element of the function input configuration table comprises data related to a different data type associated with the corresponding vehicle function input element. In this case, the transforming the value can include changing the data type to the different data type.

The vehicle control module can also include a computer accessible memory wherein each vehicle function input element comprises a respective address in the memory where its associated transformed value is stored.

As for the module input elements, a) at least one module input element of the superset of module input elements can be a member of both the first subset of module input elements and the second subset of module input elements, and b) at least one module input element of the superset of module input elements can be a member of only one of the first subset of module input elements or the second subset of module input elements.

As for the module input variables, a) at least one module input variable of the superset of module input variables can be a member of both the first subset of module input variables and the second subset of module input variables, and b) at least one module input variable of the superset of module input variables can be a member of only one of the first subset of module input variables or the second subset of module input variables.

Another aspect of the present invention relates to a method for a vehicle control module capable of operating on one of first and second materials handling vehicles. The method includes providing a) a module input table comprising a superset of module input elements, wherein the superset of module input elements comprises a first subset of module input elements related to a first set of hardware devices provided on the first vehicle and a second subset of module input elements related to a second set of hardware devices provided on the second vehicle; b) at least one configuration table comprising respective configuration elements corresponding to ones of the superset of module input elements, wherein each respective configuration element comprises data related to effect a transformation of a value associated with the corresponding module input element of the module input table; and c) vehicle function input elements related to vehicle function inputs utilized on the first vehicle and the second vehicle. The method also includes determining a value associated with a module input element of the module input table corresponding to a vehicle function input element; transforming the value to a transformed value; and linking the transformed value with the corresponding vehicle function input element.

One aspect of the present invention relates to a computer-based vehicle control module capable of operating on one of first and second materials handling vehicles. This module includes a source table comprising a first superset of source elements, wherein the first superset of source elements comprises a first subset of source elements related to a first set of hardware devices provided on the first vehicle and a second subset of source elements related to a second set of hardware devices provided on the second vehicle. The module also includes at least one configuration table comprising respective configuration elements corresponding to ones of the first superset of source elements, wherein each respective configuration element comprises data related to effect a transformation of a value associated with the corresponding source element of the source table. A vehicle function input table is also included comprising a set of vehicle function input elements related to vehicle function inputs utilized on the first vehicle and the second vehicle. The module also includes structure for determining a value of a source element of the source table corresponding to a vehicle function input element of the vehicle function input table, transforming the value to a transformed value and linking the transformed value with the corresponding vehicle function input element.

Another aspect of the present invention relates to a method for a vehicle control module capable of operating on one of first and second materials handling vehicles. The method includes providing a source table comprising a first superset of source elements, wherein the first superset of source elements comprises a first subset of source elements related to a first set of hardware devices provided on the first vehicle and a second subset of source elements related to a second set of hardware devices provided on the second vehicle. The method also includes providing at least one configuration table comprising respective configuration elements corresponding to ones of the first superset of source elements, wherein each respective configuration element comprises data related to effect a transformation of a value associated with the corresponding source element of the source table. A vehicle function input table is also provided comprising a set of vehicle function input elements related to vehicle function inputs utilized on the first vehicle and the second vehicle. The method also includes a) determining a value of a source element of the source table corresponding to a vehicle function input element of the vehicle function input table; b) transforming the value to a transformed value; and c) linking the transformed value with the corresponding vehicle function input element.

In accordance with one particular aspect, each element of the source table and each element of the vehicle function input table can include a respective address in a memory where its associated value is stored. Furthermore, transforming the value can include one or more of: leaving the value unchanged; bit masking the value; bit-shifting the value; adding a predetermined offset to the value; and multiplying the value by a predetermined gain. Also, the hardware devices implemented on the one of the first and the second vehicles can include one or more of: a bus of a vehicle network; an encoder; a switch; an analog sensor; and a digital sensor.

In accordance with one aspect of the invention, the at least one configuration table can include a module input configuration table comprising respective module input configuration elements corresponding to ones of the first superset of source elements, wherein each respective module input configuration element comprises data to effect a first transformation related to the value associated with the corresponding source element of the source table. The at least one configuration table can also include a function input configuration table comprising respective function input configuration elements corresponding to ones of the vehicle function input elements, wherein each respective function input configuration element comprises data to effect a second transformation related to the value associated with the corresponding source element of the source table. Accordingly, the transforming of the value to the transformed value can include determining the transformed value based on the first transformation and the second transformation.

Further, in accordance with an aspect of the invention, the method can include providing a routing table comprising entries related to: a) associated vehicle function input elements, and b) associated source elements of one of the first and second subsets of source elements corresponding to one of the first and the second vehicle on which the vehicle control module is operating. Thus, determining the value of a source element can include a) determining the source element associated with the vehicle function input element that is associated with the entry, and b) determining the value associated with the corresponding source element of the source table, and transforming the value to the transformed value can include a) determining a respective configuration element of each of first and second configuration tables corresponding to the associated source element, and b) based on the corresponding respective configuration elements, transforming the value to the transformed value, which is linked to the vehicle function input element associated with the entry. Furthermore, the number of entries of the routing table can equal the number of elements of the vehicle function input table.

Additionally, in accordance with an aspect of the invention, the first superset can also include a third subset of source elements related to one or more default values and the routing table can include one or more entries related to: a) associated vehicle function input elements, and b) associated source elements of the third subset. For each entry of the routing table related to the third subset of source elements the following steps can be performed: a) determining the source element associated with the vehicle function input element that is associated with the entry, b) determining a respective configuration element of each of the first and second configuration tables corresponding to the associated source element, c) determining the value associated with the corresponding source element of the source table, and d) based on the corresponding respective configuration elements, transforming the value to the transformed value, which is linked to the vehicle function input element associated with the entry.

In accordance with another aspect, each element of the module input configuration table comprises data related to a data type of the value associated with the corresponding element of the source table and each element of the function input configuration table comprises data related to a different data type associated with the corresponding element of the vehicle function input table. Thus, the transforming the value can include changing the data type to the different data type.

In accordance with yet another aspect of the invention, at least one element of the first superset of source elements is a member of both the first subset of source elements and the second subset of source elements. Alternatively, or in addition, at least one element of the first superset of source elements is a member of only one of the first subset of source elements or the second subset of source elements.

Yet another aspect of the present invention relates to a computer-based vehicle control module capable of operating on one of first and second materials handling vehicles. The module includes a) a source table comprising a first superset of source elements, wherein the first superset of source elements comprises a first subset of source elements related to a first set of hardware devices provided on the first vehicle and a second subset of source elements related to a second set of hardware devices provided on the second vehicle; b) a module input configuration table comprising respective module input configuration elements corresponding to ones of the first superset of source elements, wherein each respective module input configuration element comprises data related to effect a transformation of a value associated with the corresponding source element of the source table; and c) a vehicle function input table comprising a set of vehicle function input elements related to vehicle function inputs utilized on the first vehicle and the second vehicle. The module can also include a routing table comprising entries related to: a) associated vehicle function input elements, and b) associated source elements of one of the first and second subsets of source elements corresponding to one of the first and the second vehicle on which the vehicle control module is operating. A routing engine included in the module, that when executed on the one of the first and second vehicles, is configured, for each entry of the routing table, to: a) determine the source element associated with the vehicle function input element that is associated with the entry, b) determine the module input configuration element of the module input configuration table corresponding to the associated source element, c) determine the value associated with the corresponding source element of the source table, and d) based on the corresponding module input configuration element, transform the value to a transformed value.

The vehicle control module may further comprise: a function input configuration table comprising respective function input configuration elements corresponding to ones of the vehicle function input elements, wherein each respective function input configuration element comprises data related to effect a further transformation of the transformed value associated with the corresponding source element of the source table. The routing engine, that when executed on the one of the first and second vehicles, may be further configured, for each entry of the routing table, to: e) based on the corresponding function input configuration element, further transform the transformed value to a further transformed value, f) link the further transformed value with the vehicle function input element associated with the entry.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
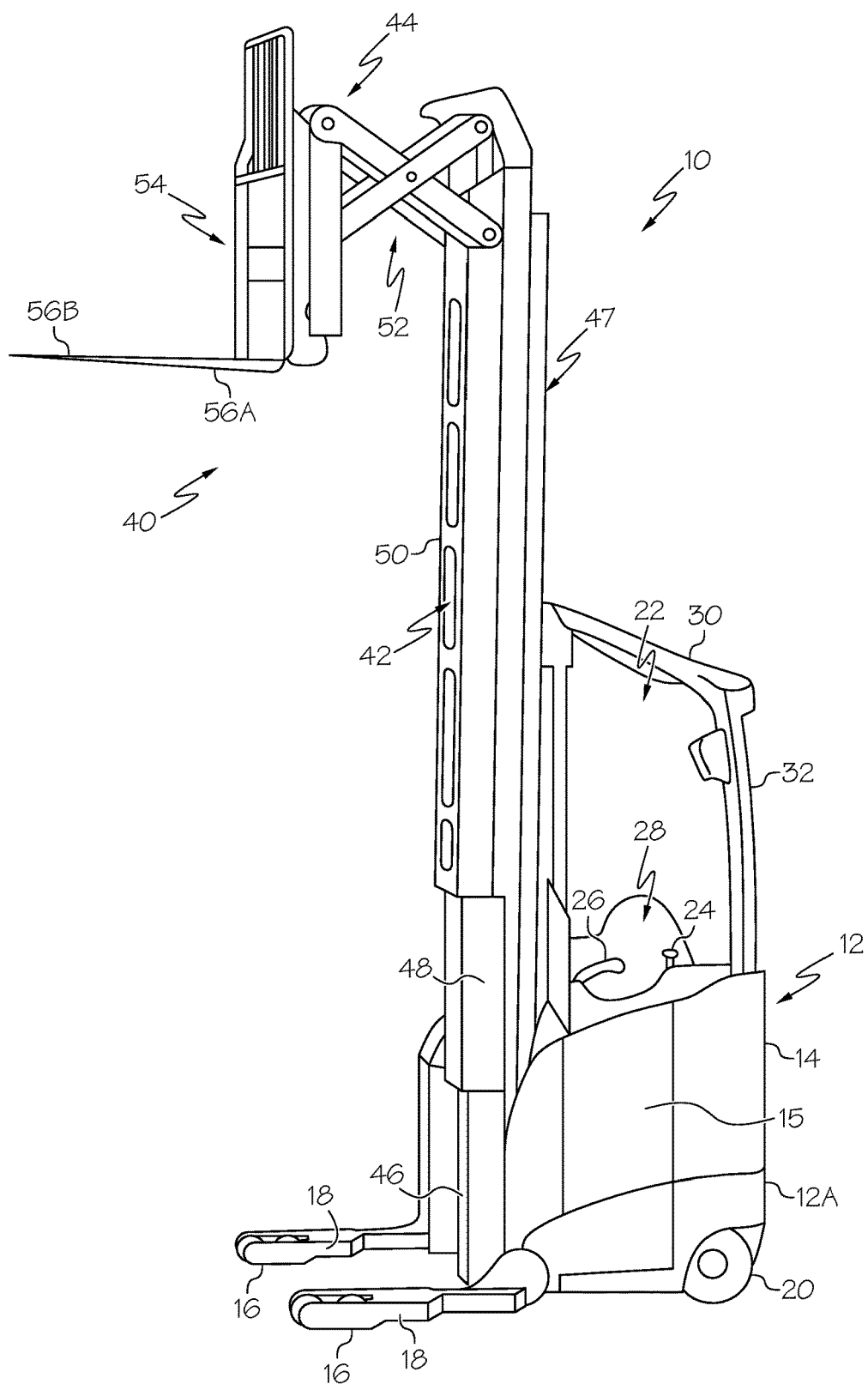
FIG. 1 is a perspective view of a materials handling vehicle according to an aspect of the present invention.

Referring now to FIG. 1, a materials handling vehicle 10 (hereinafter "vehicle") is shown. While the present invention is described herein with reference to the illustrated vehicle 10, which comprises a forklift truck, it will be apparent to those skilled in the art that the present invention may be used in a variety of other types of materials handling vehicles.

The vehicle 10 includes a main body or power unit 12, which includes a frame 14 defining a main structural component of the vehicle 10 and which houses a battery 15. The vehicle 10 further comprises a pair of fork-side support wheels 16 coupled to first and second outriggers 18, a driven and steered wheel 20 mounted near a first corner at a rear 12A of the power unit 12, and a caster wheel (not shown) mounted to a second corner at the rear 12A of the power unit 12. The wheels 16, 20 allow the vehicle 10 to move across a floor surface.

An operator's compartment 22 is located within the power unit 12 for receiving an operator driving the vehicle 10. A tiller knob 24 is provided within the operator's compartment 22 for controlling steering of the vehicle 10. The speed and direction of movement (forward or reverse) of the vehicle 10 are controlled by the operator via a multi-function control handle 26 provided adjacent to an operator seat 28, which control handle 26 may control one or more other vehicle functions as will be appreciated by those having ordinary skill in the art. The vehicle 10 further includes an overhead guard 30 including a vertical support structure 32 affixed to the vehicle frame 14.

A load handling assembly 40 of the vehicle 10 includes, generally, a mast assembly 42 and a carriage assembly 44, which is movable vertically along the mast assembly 42. The mast assembly 42 is positioned between the outriggers 18 and includes a fixed mast member 46 affixed to the frame 14, and nested first and second movable mast members 48, 50. It is noted that the mast assembly 42 may include additional or fewer movable mast members than the two shown in FIG. 1, i.e., the first and second movable mast members 48, 50. The carriage assembly 44 includes conventional structure including a reach assembly 52, a fork carriage 54, and fork structure comprising a pair of forks 56A, 56B. A movable assembly 47 as defined herein includes the lower and upper movable mast members 48, 50 and the carriage assembly 44. The mast assembly 42 may be configured as the monomast described in U.S. Pat. No. 8,714,311 to Steven C. Billger et al., granted on May 6, 2014 and assigned to the applicant, Crown Equipment Corporation, the entire disclosure of which is hereby incorporated by reference herein.

The vehicle 10 of FIG. 1 is provided by way of example and many different types of materials handling trucks are contemplated within the scope of the present invention. As described in detail below, aspects of a vehicle control module are provided which allow a number of identical components to be utilized on various vehicles even though the vehicles may be of different types.

Figure 2A:
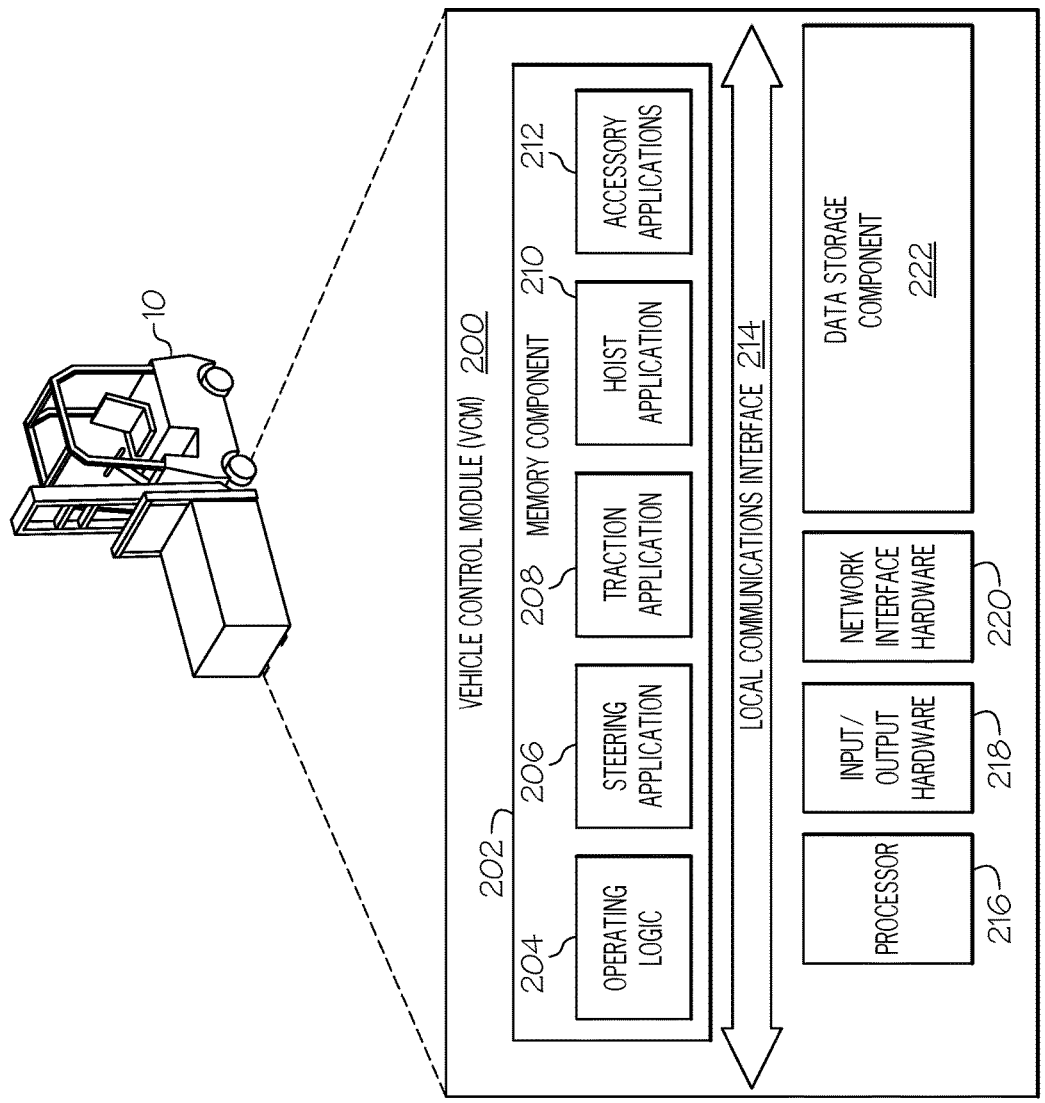
FIG. 2A depicts a computing environment for providing control logic in a vehicle control module (VCM) of the vehicle of FIG. 1.

FIG. 2A depicts a block-level view of a computing environment for providing control logic and software applications in a vehicle control module (VCM) 200, according to one or more embodiments shown and described herein.

In the illustrated embodiment, the VCM 200 includes one or more processors or microcontrollers 216, input/output hardware 218, network interface hardware 220, a data storage component 222, and a memory component 202. The data storage component 222 and the memory component 202 may each be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Any stored information that is intended to be available after the vehicle 10 is shutdown and restarted may beneficially be stored in non-volatile memory. Also, depending on the particular embodiment, the non-transitory computer-readable medium, mentioned above, may reside within the VCM 200 and/or external to the VCM 200.

Additionally, the memory component 202 may store software or applications that can be executed by the one or more processors or microcontrollers 216. Thus the memory component 202 may store an operating application or logic 204, a traction application 208, a steering application 206, a hoist application 210, and accessory application(s) 212. The operating logic 204 may include an operating system and other software such as, for example, diagnostic-related applications for managing components of the VCM 200. The traction application 208 may be configured with one or more algorithms and parameters for facilitating optimal traction control for the vehicle 10. The steering application 206 may be configured with one or more algorithms and parameters for facilitating optimal steering control of the vehicle 10. The hoist application 210 may include one or more algorithms and parameters for facilitating optimal hoist control of the vehicle 10, which acts as the primary load handling assembly system used to raise and lower the moveable assembly 47 of the vehicle 10. Additionally, the accessory application 212 may include one or more algorithms and parameters for providing control of accessories of the vehicle 10 such as an auxiliary load handling assembly system, which performs additional tasks such as tilt and sideshift of the carriage assembly 44. A local communication interface 214 is also included in FIG. 2A and may be implemented as a bus or other communication interface, for example a serial peripheral interface (SPI) or a serial command interface (SCI), to facilitate communication among the components of the VCM 200.

The one or more processors or microcontrollers 204 may include any processing component operable to receive and execute instructions (such as from the data storage component 222 and/or the memory component 202). The input/output hardware 218 may include and/or be configured to interface with a monitor, positioning system, keyboard, touch screen, mouse, printer, image capture device, microphone, speaker, gyroscope, compass, and/or other device for receiving, sending, and/or presenting data. The network interface hardware 220 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the VCM 200 and other computing devices including other components coupled with a CAN bus or similar network on the vehicle 10.

It should be understood that the components illustrated in FIG. 2A are merely exemplary and are not intended to limit the scope of this disclosure. While the components in FIG. 2A are illustrated as residing within the VCM 200, this is merely an example. In some embodiments, one or more of the components may reside external to the VCM 200. It should also be understood that while the VCM 200 in FIG. 2A is illustrated as a single device; this is also merely an example. In some embodiments, the traction application 208, the steering application 206, the hoist application 210, and/or the accessory application 212 may reside on different devices. Additionally, while the VCM 200 is illustrated with the traction application 208, the steering application 206, the hoist application 210, and the accessory application 212 as separate logical components, this is also an example. In some embodiments, a single, composite software application may cause the VCM 200 to provide the described functionality.

It also should be understood that the VCM 200 may communicate with various sensors and other control circuitry of the vehicle 10 to coordinate the various conditions of manual operation and automatic operation of the vehicle 10.

Figure 2B:
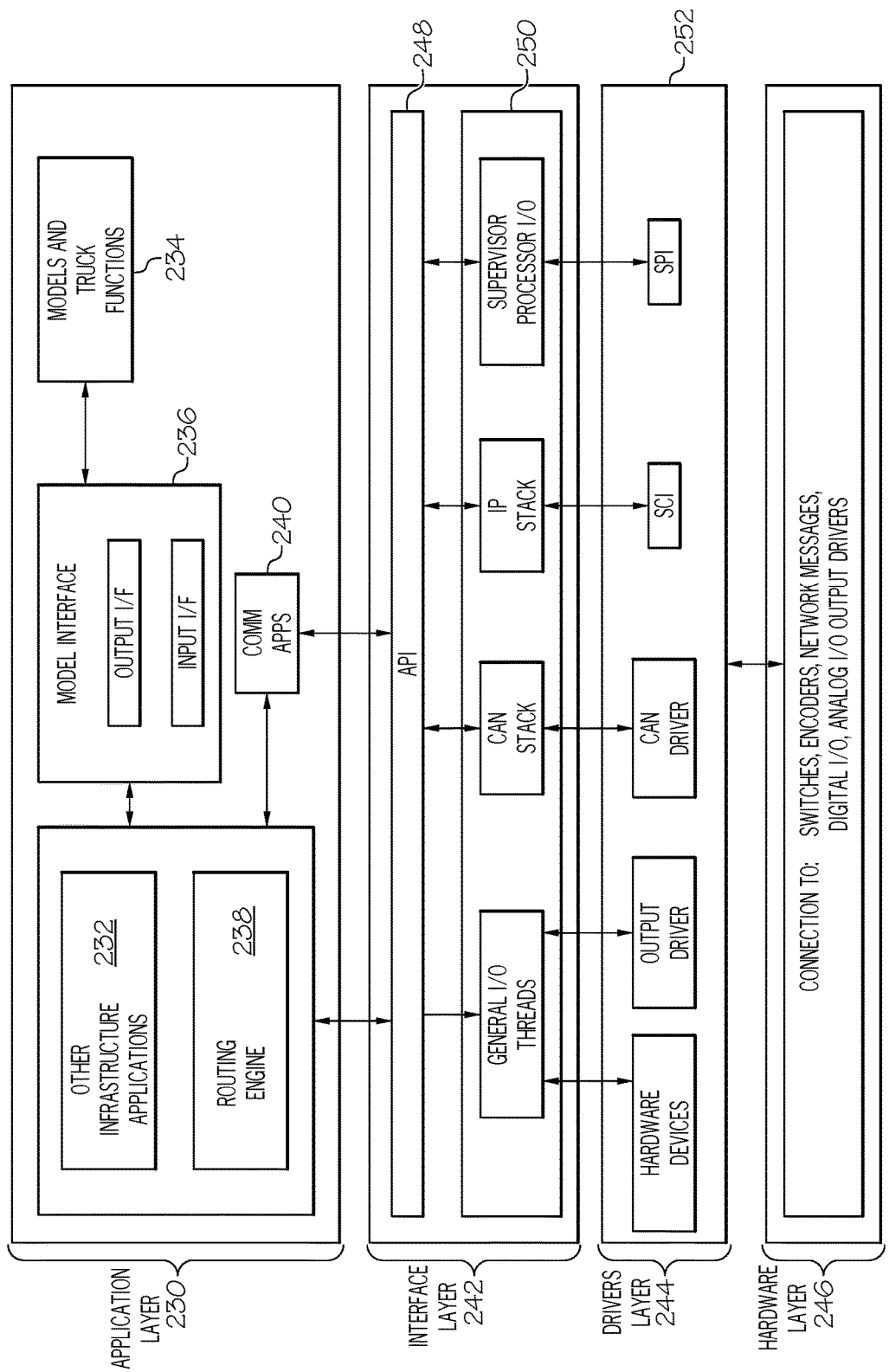
FIG. 2B schematically illustrates a conceptual view of the software architecture for the VCM in accordance with the principles of the present invention.

Referring to FIG. 2B, a conceptual view of the software architecture for the VCM 200 includes a top application layer 230 that generally includes an infrastructure box 232, a cross product models and/or truck functions box 234 and a model interface box 236 located between the infrastructure box 232 and the cross product models box 234. The application layer 230 may also include a number of communications related applications 240 that allow other applications to communicates over various busses and networks implemented on the vehicle 10. An interface layer 242, a drivers layer 244 and a hardware layer 246 are also provided.

FIG. 2A is a block-level diagram of one or more functional components of the VCM 200 and FIG. 2B depicts the software of the VCM 200 segregated into their different layers of abstraction. While there is not a one-to-one correspondence between the elements of FIG. 2A and FIG. 2B, there are some similarities as well as differences. For example, because FIG. 2B focuses mostly on software, there is no analogous element to the memory component 202 and the processor 216 from FIG. 2A. However, the I/O hardware 218, the network interface hardware 220, and the data storage component 222 of FIG. 2A are analogous to portions of the hardware layer 246 of FIG. 2B that interfaces with devices and components external to the processor 216 of the VCM 200. The local communications interface 214 of FIG. 2A includes hardware-based interconnects (e.g., signal pins, board traces, driver chips, etc.) analogous to the functionality of the drivers layer 244, such as the serial peripheral interface (SPI), a serial command interface (SCI) and other serial communication channels of FIG. 2B. As for the applications 204, 206, 208, 210, 212 of FIG. 2A, they correspond to the application layer 230 of FIG. 2B and, more particularly to the models and truck functions 234.

The interface layer 242 includes a number of interfaces 250 for specific device drivers of the drivers layer 244 that, together, provide a uniform application program interface (API) 248 for the various applications of the application layer 230. The drivers layer 244 provides specific driver software to interface with input hardware devices, drive output devices, communicate over a CAN network or other network, and implement serial protocols such as a serial peripheral interface (SPI) and a serial command interface (SCI). The top application layer 230, the interface layer 242 and the drivers layer 244 comprise generic software provided with the VCM 200 to multiple types of different vehicles. The input/output hardware structure of the hardware layer 246, e.g., connectors, which connect with input/output hardware on the vehicle, however, may vary from vehicle to vehicle.

The models box 234 represents control software generated using various SIMULINK® models, application logic, functions implemented by various software, and processes executing within the VCM environment. These software components encompassed by the models box 234 receive input related to one or more vehicle functions in order to generate commands, control instructions, or output related to controlling or affecting the operation of the vehicle 10, which commands, control instructions or other outputs related to controlling or affecting the operation of the vehicle are received by the routing engine 238 in the application layer 230. The control software provides control for the various truck systems such as, for example, hydraulics, diagnostics, throttle control, calibration, interlocks, traction, brakes, steering, battery discharge indicators, and disablement features commonly referred to as "static return to off" (SRO).

The VCM 200 is designed to be used for various vehicle model configurations and the control software, or models 234, defining the control of the various truck systems will be generic, i.e., the same, for use in any vehicle. This is advantageous as only one VCM 200 need be designed, which can be used across a portion or an entire fleet or line of vehicles, i.e., more than one vehicle model configuration, manufactured by a given vehicle manufacturer. The characteristics of the inputs/outputs received from the input/output hardware structure of the hardware layer 246 associated with different component functions can vary from vehicle model to vehicle model, and it is beneficial to provide normalized inputs/outputs to and from the control software 234 regardless of the vehicle-to-vehicle variations in the component input/output characteristics associated with each particular vehicle, i.e., vehicle model.

Figure 3A:
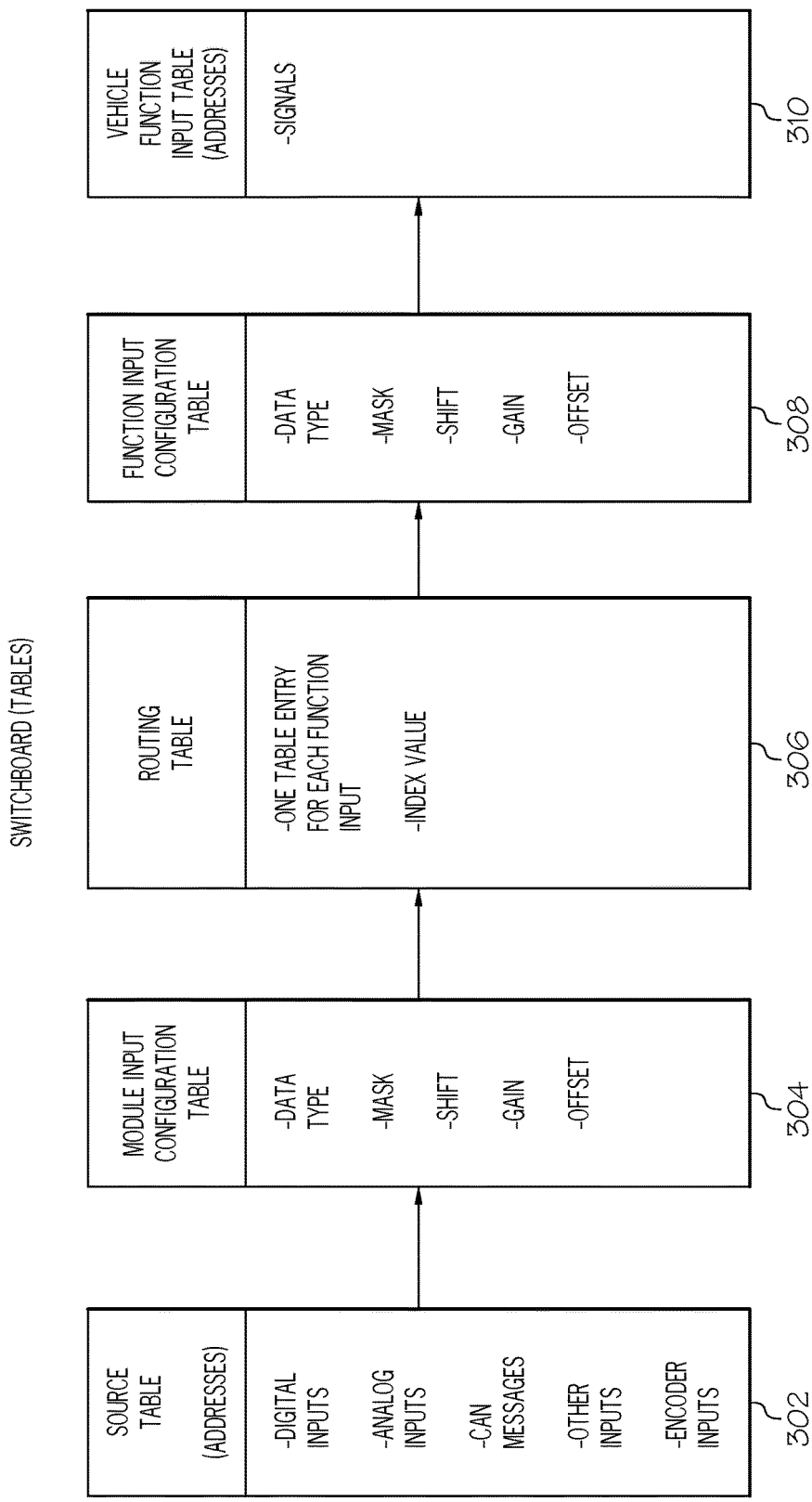
FIG. 3A illustrates a block-level view of switchboard tables used to route VCM inputs to vehicle function inputs in accordance with the principles of the present invention.
Figure 3B:
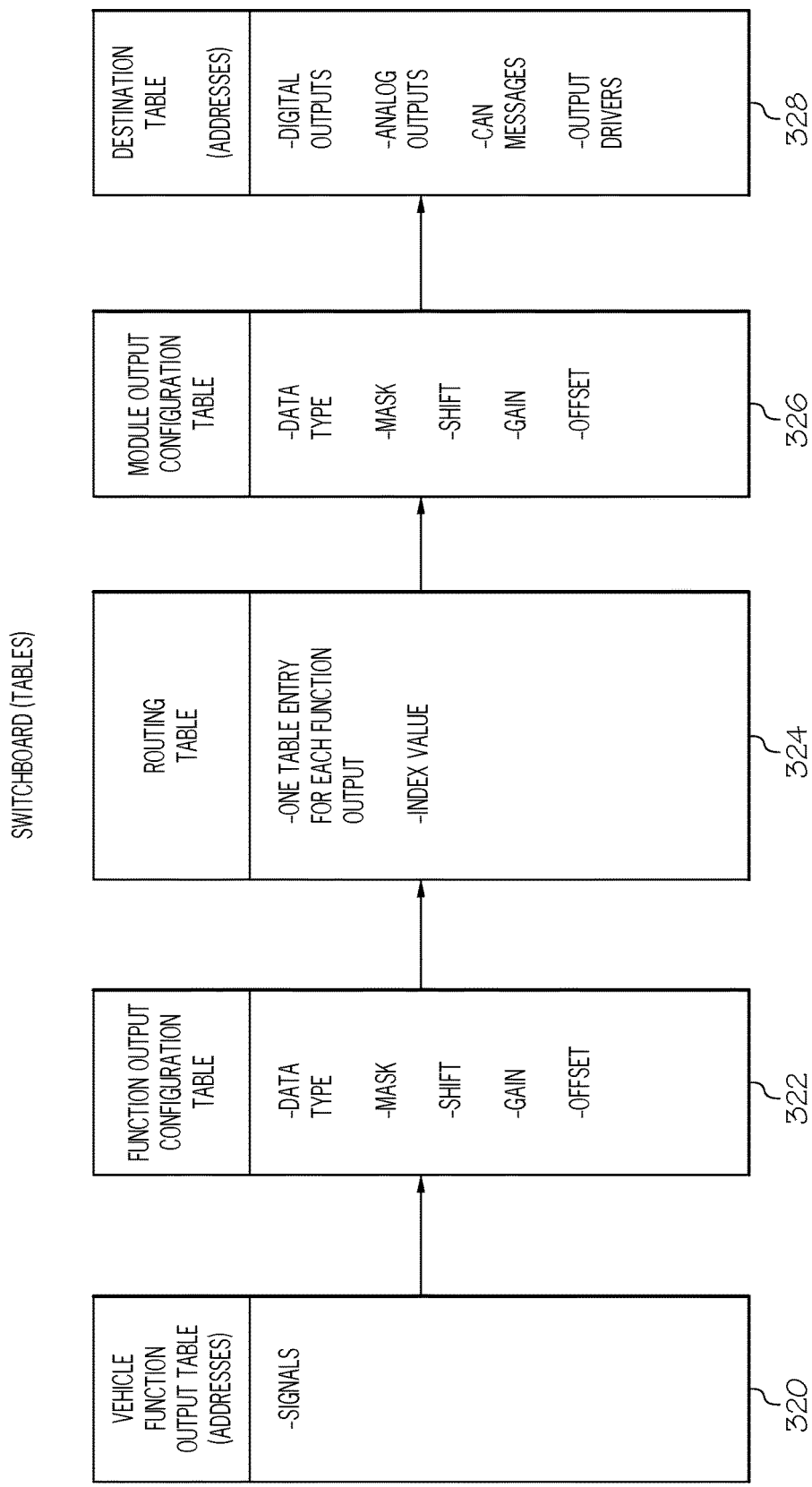
FIG. 3B illustrates a block-level view of switchboard tables used to route vehicle function outputs to VCM outputs in accordance with the principles of the present invention.

The application layer 230 further includes a switchboard comprising a routing engine 238 and switchboard tables of FIGS. 3A and 3B that operate to route the inputs from the input/output hardware structure of the hardware layer 246 to the correct vehicle function inputs of the control software 234. Furthermore, in the opposite direction, the routing engine 238 and the tables of the switchboard also provides control signals from the control software 234 to appropriate input/output hardware structure of the hardware layer 246. The VCM 200 can operate with vehicle specific configuration parameter files that are loaded into the VCM 200 upon assembly of the vehicle. For example, the parameter files or parameter data can be loaded into a region of the memory component 202 so that the parameter files can be accessed by one or more of the software components (e.g. 232, 236, 234, 238) that comprise the Application layer 230. There can be, for example, four major categories of parameters including: 1) General, 2) Module, 3) Model and 4) Truck. The parameters in category 1) can be common to all vehicle types. The parameters in category 2) can be common to all vehicles in which a same VCM 200 is installed but the parameters would differ for a different type of VCM (not shown). The parameters in categories 3) and 4) are unique to a specific truck model. The parameters in category 3) relate to the models and can, for example, be used in conjunction with MATLAB or SIMULINK code, while the parameters in category 4) can, for example, be used by other C code or software of the application layer 230. A subset of the parameters from the Truck category (i.e., category 4)) can be configured for setting up a configuration for the switchboard including the routing engine 238 and the switchboard tables that is specific to the vehicle hardware of the vehicle on which the VCM 200 is operating.

Regardless of the specific type/model of materials handling vehicle on which the VCM 200 is installed and operated, there are many common functional aspects of the VCM 200 with respect to the different types of vehicles. For example, many different types of vehicles have a steered wheel and a traction wheel. Also, many vehicles may have some type of hoist mechanism even though the specific attributes of each different hoist mechanism may be different. Thus, a common VCM 200 may be installed and operated on many different types or models of vehicles after the parameters of the four different categories have been downloaded and stored on the VCM 200. In the examples described below, the discussion of the VCM 200 indicates that the VCM 200 may be installed on two different types of vehicles. One of ordinary skill will recognize that the VCM 200 may be installed on more than two different types or models of vehicles without departing from the scope of the present invention.

A first vehicle on which the VCM 200 is operated may have a first set of hardware devices which connect or are otherwise associated with hardware structure that defines the hardware layer for the VCM 200. A second vehicle on which a similar or the same VCM 200 can be operated may have a second set of hardware devices, one or more of which are different from the hardware devices of the first set, which connect or are otherwise associated with hardware structure that defines the hardware layer for the VCM 200. There may be a superset of hardware structure, e.g., connectors, on the VCM 200, two or more of which define a first set connecting with the hardware devices of the first vehicle and two or more of which define a second set connecting with the hardware devices of the second vehicle. One or more elements, e.g., connectors, of the first set of the hardware structure may be the same as one or more elements of the second set of the hardware structure. One or more elements, e.g., connectors, of the first set of the hardware structure may not be members of the second set of the hardware structure and vice versa. In each instance, the vehicle hardware devices generate inputs that are received by the hardware structure that defines the hardware layer of the VCM 200.

Referring to FIG. 2B, the interface layer 242, drivers layer 244 and hardware layer 246 for each vehicle operate to acquire, filter and provide input signals to the application layer 230 of the VCM 200. Some of the hardware devices in the first set for the first vehicle may also be in the second set for the second vehicle. However, there may also be hardware devices that are unique to one or both of the first and second set. Thus, by combining the first and second set of hardware devices together, a superset of hardware devices can be defined which includes every different hardware device from the first and second sets. Because each hardware device also is considered to correspond to an input for the application layer 230 of the VCM 200, a superset of VCM application layer inputs is also defined which includes all the possible inputs that the application layer 230 of the VCM 200 could receive from both the first and second sets of vehicle hardware devices. These inputs can include, for example, digital input values, analog input values, network messages and packets (e.g., CAN messages, IP packets, etc.), encoder inputs, and other inputs (e.g., 4-20 ma loop).

As part of the normal operation of the VCM 200, the various hardware devices and sensors can be polled or sampled and the network bus, for example, can be monitored so that received messages can be queued so that data can be extracted. The values from the hardware devices are received as respective inputs at the hardware structure that defines the hardware layer of the VCM 200 and are stored in predetermined variables defined by the various processes of the application layer 230 of the VCM 200.

Distinct from the inputs received by the VCM 200 from vehicle hardware devices, the control software 234 on the first vehicle VCM can receive input and default values that may be different than the input and default values that are received by the control software 234 of the second vehicle VCM. For example, the first vehicle may have a feature that requires an operator to be in a seat before a traction motor is energized. The second vehicle may also require the operator to be in the seat but may further require that a battery compartment door be closed before the traction motor is energized. In both examples, the control software 234, in the illustrated embodiment, controls the operation of the traction motor but in the first example only one actual input value from a vehicle hardware device and one default value (not from a vehicle hardware device) is utilized and in the second example two actual input values from vehicle hardware devices are utilized. These actual and default "inputs" or input values received by the control software 234 can be referred to as "vehicle function inputs" and encompass a wide variety of input values that the control software may receive and then utilize to perform its functions. Since the control software 234 of the VCM 200 is substantially the same for both the first vehicle and the second vehicle, within the VCM 200 in the illustrated embodiment, there is a combination of those vehicle function inputs that are appropriate and used for both the first vehicle and the second vehicle, even though one or more of the inputs received by the two VCMs of first and second vehicles may be different. The values of the respective vehicle function inputs are stored in predetermined variables that are defined by the various processes of the application layer 230 of the VCM 200.

Because the VCM 200 can be installed and operated on either the first vehicle or the second vehicle, there may be one or more VCM input variables that correspond to one or more hardware devices that are not actually included on the vehicle on which the VCM is operated. Similarly, there may also be one or more vehicle function input variables that correspond to real input values that are not provided by vehicle hardware devices or utilized by the vehicle on which the VCM is operated. Thus, embodiments of the present invention provide a way to determine how to route VCM inputs or VCM input values received by the hardware structure of the hardware layer 246 that are provided by one or more hardware devices of a particular vehicle to specific vehicle function inputs that are also utilized by the control software 234.

FIG. 3A illustrates a block-level view of the switchboard tables used by the routing engine 238 that routes VCM inputs to memory locations corresponding to vehicle function input elements in accordance with the principles of the present invention. A "source table" 302 is constructed, or provided, by the VCM 200 which includes an element for each of the superset of VCM application layer inputs or input values that may be provided by the first vehicle and the second vehicle. Each of the elements of the source table 302 can be a memory address, as described below, and, therefore, the source table 302, also referred to herein as a module input table, comprises a superset of module input or input elements. The source table 302 in the illustrated example is the same or substantially the same in the VCMs provided for the first and second vehicles. As mentioned above, as part of the normal operation of the VCM 200, each of the VCM inputs or VCM input values is stored in a predetermined variable or memory location in either memory component 202 or data storage component 222 (See FIG. 2A). Therefore, each element of the source table 302 corresponds to a respective one of those variables or memory locations and the element can be the address in memory of that corresponding variable or memory location.

A vehicle function input table 310 is shown in FIG. 3A and has an element for each of the vehicle function inputs that can potentially be utilized by the control software 234 of the VCM 200. As mentioned above, each of the vehicle function inputs can be associated with a predetermined control software variable or memory location and stored in that predetermined variable. Therefore, each element of the vehicle function input table 310 corresponds to a respective one of those control software variables or memory locations and the value of the element can be the address in memory of that corresponding variable.

The source table 302 and the vehicle function input table 310 can be, and preferably are, the same on both the first vehicle and the second vehicle. There is, however, a routing table 306 that may be different for each of the first vehicle and second vehicle and defines the interface 236 (See FIG. 2B) between the infrastructure box 232 of the application layer 230 and the control software 234. The routing table 306 defines routes so as to allow a routing engine 238 to route, or connect similar to a switchboard, each utilized vehicle function input with a VCM input that is appropriate for the vehicle on which the VCM 200 is operating.

A module input configuration table 304 may also be provided by the VCM 200 that has an element corresponding to each element of the source table 302. The element from the module input configuration table 304 comprises data that is related to how to transform the VCM input value associated with a corresponding source table element into a value that the control software 234 can utilize. As described further below, a VCM input value can, for example, be scaled, bit-shifted, bit-masked, offset or recast as a different data type that the control software 234 is designed to utilize.

A separate function input configuration table 308 can be included as well that allows further transformation of a value before it is stored in a vehicle function input variable in order to be used by the control software 234. The function input configuration table 308 may include a respective element corresponding to each element of the vehicle function input table 310.

An example source table is provided below as TABLE 1:

| Source Table (Addresses) | Element No. |
|---|---|
| &ulAG Low, | 0 |
| &ulAG High, | 1 |
| &gSwitch[SDI SW DRV1].Control.rSwitchDriverOutput, | 2 |
| &gSwitch[SDI SW DRV2].Control.rSwitchDriverOutput, | 3 |
| &gSwitch[SDI SW DRV3].Control.rSwitchDriverOutput, | 4 |

-continued

| Source Table (Addresses) | Element No. |
|---|---|
| &gSwitch[SDI SW DRV4].Control.rSwitchDriverOutput, | 5 |
| &gSwitch[SDI SW DRV5].Control.rSwitchDriverOutput, | 6 |
| &gSwitch[SDI SW DRV6].Control.rSwitchDriverOutput, | 7 |
| &gSwitch[SDI SW DRV7].Control.rSwitchDriverOutput, | 8 |
| &gSwitch[SDI SW DRV8].Control.rSwitchDriverOutput, | 9 |
| &USR s OV.swTcmRxMotorSpeedRPM, | 10 |
| &USR s OV.swTcmRxTorqueAchievedNM, | 11 |
| &gAnalogInputs[1].ulCounts, | 12 |
| &gSupv Data.IO Interface.uPot2 Wiper Counts, | 13 |
| &gAnalogInputs[40].ulCounts, | 14 |
| &gAnalogInputs[41].ulCounts, | 15 |
| &USR s OV.ubX10DigIn1, | 16 |
| &USR s OV.ubX10DigIn1, | 17 |
| &USR s OV.ubX10DigIn1, | 18 |
| &USR s OV.ubX10DigIn1, | 19 |
| &USR s OV.ubX10DigIn1, | 20 |
| &USR s OV.ubX10DigIn1, | 21 |
| &USR s OV.ubX10DigIn1, | 22 |
| &USR s OV.ubX10DigIn1, | 23 |
| &USR s OV.swDriveUnitPositionDeg100fb1, | 24 |
| &USR s OV.swDriveUnitPositionDeg100fb2, | 25 |
| &USR s OV.swSteeringFeedBackRPM, | 26 |
| &USR s OV.swMotorCurrent, | 27 |
| &USR s OV.ubStopTraction, | 28 |
| &gAnalogInputs[0].rScaledUnits, | 29 |
| &gAnalogInputs[1].rScaledUnits, | 30 |
| &gAnalogInputs[2].rScaledUnits, | 31 |
| &gAnalogInputs[3].rScaledUnits, | 32 |
| &gAnalogInputs[4].rScaledUnits, | 33 |
| &gAnalogInputs[5].rScaledUnits, | 34 |
| &Quadrature1.slCounts, | 35 |
| &gEnergySource output.rBatteryAh, | 36 |

In this example, there are elements corresponding to 37 different VCM inputs or VCM input values received at the hardware structure that defines the hardware layer of the VCM 200. Element #0 refers to a variable "ulAG_Low" that defines a generic low-valued signal (e.g., "0") and element #1 refers to a variable "ulAG_High" that defines a generic high-valued signal (e.g., "1"). The next few elements refer to variables that store values of various switches that may be provided on the vehicle on which the VCM 200 is operating. These elements may also refer to various switches that are not provided on the vehicle on which the VCM 200 is operating. Element #35, refers to a variable corresponding to an encoder "counts" input, while elements #10 and #11 refer to variables that store values transmitted over a CAN bus. The elements #16-#23 can refer to the same variable and then be further manipulated as described below. Thus, elements from TABLE 1 can correspond to variables or memory locations which store vehicle hardware device digital inputs, vehicle hardware device analog inputs, vehicle hardware device encoder inputs, network messages, and other types of inputs. As can be seen by the contents of TABLE 1, each element is preceded by the "&" symbol which indicates the element corresponds to an address of the variable name that follows the "&" symbol.

Thus, a software process, such as the routing engine 238 may read the value (i.e., an address) of an element from TABLE 1 and then use it as a pointer to retrieve the actual value or stored input, i.e., which value may have originated from a vehicle hardware device, of the variable or memory location at that address.

An example vehicle function input table 310 is provided below as TABLE 2:

| Vehicle Function Input Table (Addresses) | Element No. |
|---|---|
| &gOp int inputs.ulBrs1, | 0 |
| &gOp int inputs.ulBrs2, | 1 |
| &gOp int inputs.ulBrs3, | 2 |
| &gOp int inputs.ulFps1, | 3 |
| &gOp int inputs.ulDms, | 4 |
| &gOp int inputs.ulGts, | 5 |
| &gOp int inputs.ulBres, | 6 |
| &gOp int inputs.ulStps, | 7 |
| &gPowerbase fb.Powerbase fb tcm1.rMotorSpeed, | 8 |
| &gPowerbase fb.Powerbase fb tcm1.rMotorTorgAchieved, | 9 |
| &gSteer inputs.slStrCmd1, | 10 |
| &gSteer inputs.slStrCmd2, | 11 |
| &gThrottleIn.Throttle input traction1.ulPosDirection, | 12 |
| &gThrottleIn.Throttle input traction1.ulNegDirection, | 13 |
| &gThrottleIn.Throttle input traction1.rAnalogThrottle, | 14 |
| &gThrottleIn.Throttle input traction1.ulStart, | 15 |
| &gSteering fdbk.MstrFdbk.rStrPos, | 16 |
| &gSteering fdbk.MstrFdbk.rStrSpd, | 17 |
| &gSteering fdbk.MstrFdbk.rStrCur, | 18 |
| &gSteering fdbk.MstrFdbk.ulStopTrx, | 19 |
| &gVehicle fb c2m bus.rPriHgtCounts, | 20 |
| &gVehicle fb c2m bus.rSecHgtCounts, | 21 |
| &gVehicle fb c2m bus.rLoadSensePressureRaw, | 22 |
| &gSOC input.rVbatt, | 23 |
| &gAccumDataMeters.Settings[21].ulValue, | 24 |

In this example there are 25 elements corresponding to 25 different vehicle function inputs that can be utilized by the control software 234 of the VCM. Elements #0-#2, for example, refer to variables that store a value related to 3 different brake switches. Elements #10 and #11, for example, refer to variables that store values representing a steering command received from the operator and elements #12-#15 refer to variables that store values related to traction commands received from the operator. In general, the elements of TABLE 2 refer to variables or memory locations that store values that can be utilized by the control software 234 for the vehicle on which the VCM 200 is operating.

An example of a configuration table for either the first or second vehicle is provided below as TABLE 3:

| Module Input Configuration Table | | | | Element No. |
|---|---|---|---|---|
| { AG UINT32, | AG NO BIT MAN, | 0u, | 0u, AG SF ARRAY 00 } | 0 |
| { AG UINT32, | AG NO BIT MAN, | 0u, | 0u, AG SF ARRAY 00 } | 1 |
| { AG FLOAT32, | AG NO BIT MAN, | 0u, | 0u, AG SF ARRAY 00 } | 2 |
| { AG FLOAT32, | AG NO BIT MAN, | 0u, | 0u, AG SF ARRAY 00 } | 3 |
| { AG FLOAT32, | AG NO BIT MAN, | 0u, | 0u, AG SF ARRAY 00 } | 4 |
| { AG FLOAT32, | AG NO BIT MAN, | 0u, | 0u, AG SF ARRAY 00 } | 5 |
| { AG FLOAT32, | AG NO BIT MAN, | 0u, | 0u, AG SF ARRAY 00 } | 6 |
| { AG FLOAT32, | AG NO BIT MAN, | 0u, | 0u, AG SF ARRAY 00 } | 7 |
| { AG FLOAT32, | AG NO BIT MAN, | 0u, | 0u, AG SF ARRAY 00 } | 8 |
| { AG FLOAT32, | AG NO BIT MAN, | 0u, | 0u, AG SF ARRAY 00 } | 9 |
| { AG INT16, | AG NO BIT MAN, | 0u, | 0u, AG SF ARRAY 00 } | 10 |
| { AG INT16, | AG NO BIT MAN, | 0u, | 0u, AG SF ARRAY 00 } | 11 |
| { AG UINT32, | AG NO BIT MAN, | 0u, | 0u, AG SF ARRAY 00 } | 12 |
| { AG UINT32, | AG NO BIT MAN, | 0u, | 0u, AG SF ARRAY 00 } | 13 |
| { AG UINT32, | AG NO BIT MAN, | 0u, | 0u, AG SF ARRAY 00 } | 14 |
| { AG UINT32, | AG NO BIT MAN, | 0u, | 0u, AG SF ARRAY 00 } | 15 |
| { AG UINT8, | AG RIGHT, | 0x01u, | 0u, AG SF ARRAY 00 } | 16 |
| { AG UINT8, | AG RIGHT, | 0x02u, | 1u, AG SF ARRAY 00 } | 17 |
| { AG UINT8, | AG RIGHT, | 0x04u, | 2u, AG SF ARRAY 00 } | 18 |
| { AG UINT8, | AG RIGHT, | 0x08u, | 3u, AG SF ARRAY 00 } | 19 |
| { AG UINT8, | AG RIGHT, | 0x10u, | 4u, AG SF ARRAY 00 } | 20 |
| { AG UINT8, | AG RIGHT, | 0x20u, | 5u, AG SF ARRAY 00 } | 21 |
| { AG UINT8, | AG RIGHT, | 0x40u, | 6u, AG SF ARRAY 00 } | 22 |
| { AG UINT8, | AG RIGHT, | 0x80u, | 7u, AG SF ARRAY 00 } | 23 |
| { AG INT16, | AG NO BIT MAN, | 0u, | 0u, AG SF ARRAY 00 } | 24 |
| { AG INT16, | AG NO BIT MAN, | 0u, | 0u, AG SF ARRAY 00 } | 25 |
| { AG INT16, | AG NO BIT MAN, | 0u, | 0u, AG SF ARRAY 00 } | 26 |
| { AG INT16, | AG NO BIT MAN, | 0u, | 0u, AG SF ARRAY 00 } | 27 |
| { AG UINT8, | AG NO BIT MAN, | 0u, | 0u, AG SF ARRAY 00 } | 28 |
| { AG FLOAT32, | AG NO BIT MAN, | 0u, | 0u, AG SF ARRAY 00 } | 29 |
| { AG FLOAT32, | AG NO BIT MAN, | 0u, | 0u, AG SF ARRAY 00 } | 30 |
| { AG FLOAT32, | AG NO BIT MAN, | 0u, | 0u, AG SF ARRAY 00 } | 31 |
| { AG FLOAT32, | AG NO BIT MAN, | 0u, | 0u, AG SF ARRAY 00 } | 32 |
| { AG FLOAT32, | AG NO BIT MAN, | 0u, | 0u, AG SF ARRAY 00 } | 33 |
| { AG FLOAT32, | AG NO BIT MAN, | 0u, | 0u, AG SF ARRAY 00 } | 34 |
| { AG INT32, | AG NO BIT MAN, | 0u, | 0u, AG SF ARRAY 00 } | 35 |
| { AG FLOAT32, | AG NO BIT MAN, | 0u, | 0u, AG SF ARRAY 16 } | 36 |

In this example, there are 37 elements that each correspond to a respective element of the source table 302. As mentioned above, a stored input value of the variable or memory location pointed to by an address of an element in the source table 302 can be transformed so that it has properties expected by the control software 234. Thus, element #17 of the source table 302 holds the address for the variable or memory location "USR_s_OV.ubX10DigIn1"

and the value stored at the address location can be transformed utilizing the corresponding element (i.e., #17) from TABLE 3:

{AG_UINT8, AG_RIGHT, 0x02u, 1u, AG_SF_ARRAY_00}.

The above transformation data is provided merely by way of example and one of ordinary skill will recognize that a number of different or additional data transformations can be implemented without departing from the scope of the present invention. Different amounts of bit shifting can be performed and various bitmasks can be applied. Different scale factors are contemplated to account for different hardware configurations on different types of vehicles and the data type for variables can include unsigned, signed, long, floating, Boolean, integer, etc.

In the above example element #17, "AG_UINT8" indicates the value of USR_s_OV.ubX10DigIn1 is of type unsigned, 8 bit integer and this variable type can be recast, as explained below, using an element from a separate function input configuration table. The portion "0x02u" indicates a bit mask of "0000 0010" should be applied and the portions "AG_RIGHT" and "1u" indicate that the value is to be bit shifted to the right and by "1" bits, respectively. The last portion "AG_SF_ARRAY_00" can be an index into an array that stores different scaling factors. For example, there may be 4 different scaling factors routinely used that are stored in an array that can be indexed by AG_SF_ARRAY_00-AG_SF_ARRAY_03. The configuration table element identifies which index to use to read the appropriate scaling factors from that array. Each scaling factor can, for example, include both an offset amount that is added to a variable's value and a gain amount that is multiplied by the variable's value. An offset of 0.0 and a gain of 1.0 would leave the variable's value unchanged.

One example routing table 306 for a first vehicle type is provided below as TABLE 4A:

| Input Routing Table (Vehicle #1) | Entry No. |
| --- | --- |
| { PROCESS SYS MODEL, AG IN SWITCH4 }, | 0 |
| { PROCESS SYS MODEL, AG IN SWITCH5 }, | 1 |
| { PROCESS SYS MODEL, AG IN SWITCH8 }, | 2 |
| { PROCESS SYS MODEL, AG IN NOT USED HIGH }, | 3 |
| { PROCESS SYS MODEL, AG IN SWITCH3 }, | 4 |
| { PROCESS SYS MODEL, AG IN NOT USED HIGH }, | 5 |
| { PROCESS SYS MODEL, AG IN NOT USED HIGH }, | 6 |
| { PROCESS SYS MODEL, AG IN NOT USED HIGH }, | 7 |
| { PROCESS SYS MODEL, AG IN RX TCM MOTOR SPEED }, | 8 |
| { PROCESS SYS MODEL, AG IN RX TCM TORQUE ACHIEVED }, | 9 |
| { PROCESS SYS MODEL, AG IN ANALOG INPUT1 COUNTS }, | 10 |
| { PROCESS SYS MODEL, AG IN ANALOG INPUT2 COUNTS }, | 11 |
| { PROCESS SYS MODEL, AG IN SWITCH1 }, | 12 |
| { PROCESS SYS MODEL, AG IN SWITCH2 }, | 13 |
| { PROCESS SYS MODEL, AG ANALOG INPUT SCALED UNITS3 }, | 14 |
| { PROCESS SYS MODEL, AG IN NOT USED LOW }, | 15 |
| { PROCESS SYS MODEL, AG IN SCM DRIVE UNIT POSITIONFB1 }, | 16 |
| { PROCESS SYS MODEL, AG IN SCM STEERING FB SPEED }, | 17 |
| { PROCESS SYS MODEL, AG IN SCM MOTOR CURRENT }, | 18 |
| { PROCESS SYS MODEL, AG IN SCM STOP TRACTION }, | 19 |
| { PROCESS SYS MODEL, AG IN IOM0807 1 ECR1 }, | 20 |
| { PROCESS SYS MODEL, AG IN RX HCM ENCODER2 }, | 21 |
| { PROCESS SYS MODEL, AG ANALOG INPUT SCALED UNITS2 }, | 22 |
| { PROCESS SYS MODEL, AG ANALOG INPUT SCALED UNITS4 }, | 23 |
| { PROCESS SYS MODEL, AG IN BATT AMP HOURS }, | 24 |

Another example routing table 306 for a second vehicle is provided below as TABLE 4B:

| Input Routing Table (Vehicle #2) | Entry No. |
| --- | --- |
| { PROCESS SYS MODEL, AG IN X10 DIGIN1 }, | 0 |
| { PROCESS SYS MODEL, AG IN NOT USED HIGH }, | 1 |
| { PROCESS SYS MODEL, AG IN NOT USED HIGH }, | 2 |
| { PROCESS SYS MODEL, AG IN NOT USED HIGH }, | 3 |
| { PROCESS SYS MODEL, AG IN SWITCH2 }, | 4 |
| { PROCESS SYS MODEL, AG IN NOT USED HIGH }, | 5 |
| { PROCESS SYS MODEL, AG IN SWITCH6 }, | 6 |
| { PROCESS SYS MODEL, AG IN SWITCH7 }, | 7 |
| { PROCESS SYS MODEL, AG IN RX TCM MOTOR SPEED }, | 8 |
| { PROCESS SYS MODEL, AG IN RX TCM TORQUE ACHIEVED }, | 9 |
| { PROCESS SYS MODEL, AG IN ANALOG INPUT1 COUNTS }, | 10 |
| { PROCESS SYS MODEL, AG IN ANALOG INPUT2 COUNTS }, | 11 |
| { PROCESS SYS MODEL, AG IN X10 DIGIN5 }, | 12 |
| { PROCESS SYS MODEL, AG IN X10 DIGIN4 }, | 13 |
| { PROCESS SYS MODEL, AG IN X10 ANALOG3 }, | 14 |
| { PROCESS SYS MODEL, AG IN NOT USED LOW }, | 15 |
| { PROCESS SYS MODEL, AG IN SCM DRIVE UNIT POSITIONFB1 }, | 16 |
| { PROCESS SYS MODEL, AG IN SCM STEERING FB SPEED }, | 17 |
| { PROCESS SYS MODEL, AG IN SCM MOTOR CURRENT }, | 18 |
| { PROCESS SYS MODEL, AG IN SCM STOP TRACTION }, | 19 |
| { PROCESS SYS MODEL, AG IN MASTER ENC1 COUNTS }, | 20 |

-continued

| Input Routing Table (Vehicle #2) | Entry No. |
|---|---|
| { PROCESS SYS MODEL, AG IN NOT USED LOW }, | 21 |
| { PROCESS SYS MODEL, AG ANALOG INPUT SCALED UNITS6 }, | 22 |
| { PROCESS SYS MODEL, AG ANALOG INPUT SCALED UNITS5 }, | 23 |
| { PROCESS SYS MODEL, AG IN BATT AMP HOURS }, | 24 |

Each of the routing tables has 25 entries with each entry corresponding to a respective element of the vehicle function input table 310. The routing engine 238 can be utilized by different processes executing on the VCM 200 and, therefore, each routing table entry in the above examples includes two parts. The first part "PROCESS_SYS_MODEL" is provided merely as an example and can be omitted without departing from the scope of the present invention. This first part identifies the name of the process with which this particular entry of the routing table is utilized. As an example, a different process (e.g., "PROCESS_ANALOG") could have its own portion, or entries, of the routing table to be utilized by the routing engine 238 in order to traverse all of the available analog inputs and acquire current values from those inputs.

Figure 4:
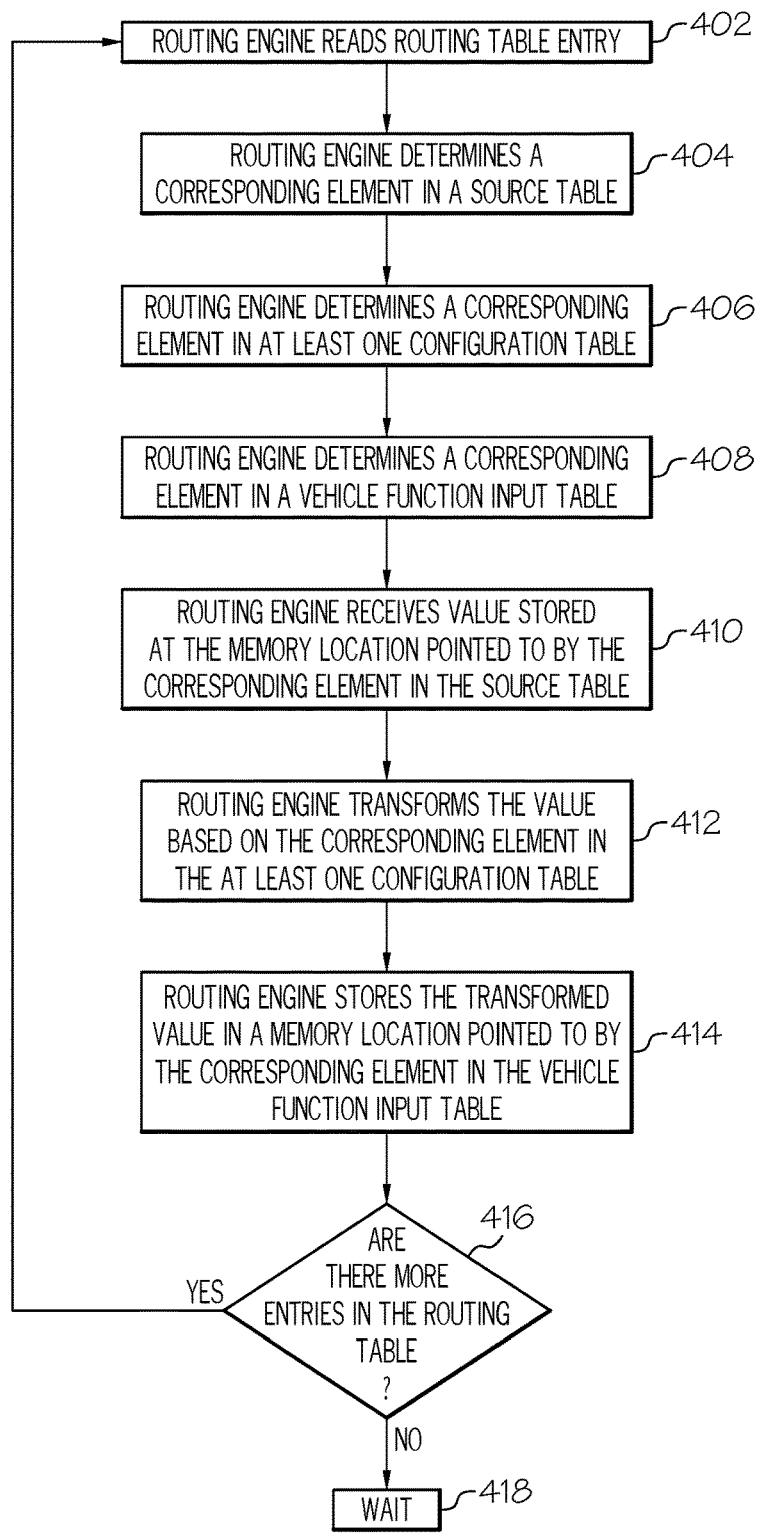
FIG. 4 is a flowchart of an example method for routing VCM inputs to vehicle function inputs in accordance with the principles of the present invention.

The second part of an entry, for example entry #14, "AG_IN_X10_ANALOG3" in Table 4B identifies one of the VCM inputs received by the hardware structure of the hardware layer 246 to route to a memory location corresponding to entry #14 of the vehicle function input table 310. As will be described below, with respect to FIG. 4, the differences between the entries of TABLE 3, TABLE 4A, TABLE 4B and TABLE 5 allow customization of the interface 236 for the different types of vehicles on which the VCM 200 operates. These routing and configuration tables allow the same VCM input table 302 and the same vehicle function input table 310 to be used on different types of vehicles that have different hardware devices. FIG. 4 is a flowchart of an example method for routing VCM inputs to vehicle function inputs in accordance with the principles of the present invention. In the example embodiments described herein, an example module input configuration table 304 and an example function input configuration table 308 are used for both the first and second vehicles. However, either or both tables 304 and 308 can be customized for different vehicles in other embodiments.

The routing table 306, the function input configuration table 308, and the vehicle function input table 310 have the same number of entries, and entry #x of the routing table 306 corresponds, or is associated with, element #x of the function input configuration table 308 and element #x of the vehicle function input table 310. The source table 302 and the module input configuration table 304 have the same number of elements which may be different than the number of entries in the routing table 306. Element #y of the source table 302 corresponds, or is associated with, element #y of the configuration table 304.

One example way that the entries from the routing table 306 can be used to route a VCM input value to a memory location corresponding to a vehicle function input element is to create an enumerated index into the source table 302 and the module input configuration table 304. For example, if the VCM input table (i.e., the source table 302) is considered an array "Module_Input [ ]", then a particular element can be referenced by "Module_Input [i]". If the index "i" is an enumerated type defined by the following list:

| Index of the Module Inputs | Index No. |
|---|---|
| AG IN NOT USED LOW = 0, | 0 |
| AG IN NOT USED HIGH, | 1 |
| AG IN SWITCH1, | 2 |
| AG IN SWITCH2, | 3 |
| AG IN SWITCH3, | 4 |
| AG IN SWITCH4, | 5 |
| AG IN SWITCH5, | 6 |
| AG IN SWITCH6, | 7 |
| AG IN SWITCH7, | 8 |
| AG IN SWITCH8, | 9 |
| AG IN RX TCM MOTOR SPEED, | 10 |
| AG IN RX TCM TORQUE ACHIEVED, | 11 |
| AG IN ANALOG INPUT1 COUNTS, | 12 |
| AG IN ANALOG INPUT2 COUNTS, | 13 |
| AG IN ANALOG INPUT3 COUNTS, | 14 |
| AG IN ANALOG INPUT4 COUNTS, | 15 |
| AG IN X10 DIGIN1, | 16 |
| AG IN X10 DIGIN2, | 17 |
| AG IN X10 DIGIN3, | 18 |
| AG IN X10 DIGIN4, | 19 |
| AG IN X10 DIGIN5, | 20 |
| AG IN X10 DIGIN6, | 21 |
| AG IN X10 DIGIN7, | 22 |
| AG IN X10 DIGIN8, | 23 |
| AG IN SCM DRIVE UNIT POSITIONFB1, | 24 |
| AG IN SCM DRIVE UNIT POSITIONFB2, | 25 |
| AG IN SCM STEERING FB SPEED, | 26 |
| AG IN SCM MOTOR CURRENT, | 27 |
| AG IN SCM STOP TRACTION, | 28 |
| AG ANALOG INPUT SCALED UNITS0, | 29 |
| AG ANALOG INPUT SCALED UNITS1, | 30 |
| AG ANALOG INPUT SCALED UNITS2, | 31 |
| AG ANALOG INPUT SCALED UNITS3, | 32 |
| AG ANALOG INPUT SCALED UNITS4, | 33 |
| AG ANALOG INPUT SCALED UNITS5, | 34 |
| AG IN MASTER ENC1 COUNTS, | 35 |
| AG IN BATT AMP HOURS, | 36 | then by assigning "i" to equal one of the enumerated values (e.g., AG_IN_SCM_MOTOR_CURRENT, or AG_IN_BATT_AMP_HOURS, etc.) an index value is generated that refers to one of the 37 possible VCM inputs. For example, if AG_IN_SCM_MOTOR_CURRENT is provided as the enumerated value then the index value or number that is generated to be used to reference an element of the source table 302 will be #27. As another example, if AG_IN_BATT_AMP_HOURS is provided as the enumerated value then the index value or number that is generated to be used to reference an element of the source table 302 will be #36. Each of the entries in either routing table TABLE 4A or TABLE 4B refers to one of the 37 enumerated values in the above table.

As mentioned, FIG. 4 is a flowchart of an example method for routing VCM inputs to memory locations corresponding to vehicle function input elements in accordance with the principles of the present invention. One of ordinary skill will recognize that the steps of the flowchart of FIG. 4 do not have to be performed in the specific order described below. Some steps may be done in parallel with one another such that the routing functionality can be provided in a variety of different ways. The routing engine 238 is periodically executed such that it may traverse the entire routing table 306 and then wait until it is called once again to execute. In traversing the entire routing table 306, the routing engine will perform routing of those entries tagged with the process (e.g., "PROCESS_SYS_MODEL", or "PROCESS_ANALOG") and skip those entries with a different tag. The routing engine begins in step 402 by reading the first entry of the routing table 306 and, based on the entry, determines, in step 404, a corresponding element in the source table 302.

If the first vehicle routing table TABLE 4A is used, then the routing engine 238 determines that routing table entry #0 identifies "AG_IN_SWITCH4" and based on the enumerated index i.e., index of module inputs, this corresponds to index value #5 in the "Index of the Module Inputs" list and element #5 in the source table 302, which corresponds to variable "&gSwitch[SDI_SW_DRV4].Control.rSwitchDriverOutput". In step 406, based on the routing table entry, the routing engine can determine a corresponding element of the module input configuration table 304 which, in this case, element #5 is: {AG_FLOAT32, AG_NO_BIT_MAN, 0u, 0u, AG_SF_ARRAY_00}. In step 408, the routing engine determines the corresponding element from the vehicle function input table 310. There is a one-to-one correspondence between the routing table 306 and the vehicle function input table 310. Hence, entry #0 of the routing table corresponds to the element #0 of the vehicle function input table 310, which is identified as: &gOp_int_inputs.ulBrs1. Entry #1 of the routing table corresponds to element #1 of the vehicle function input table 310 and this one-to-one correspondence continues with all of the remaining entries and elements in the routing table and the vehicle function input table 310. In step 410, the routing engine retrieves the VCM value, i.e., which value may have originated from a vehicle hardware device, of the variable pointed to by the address from the corresponding source table element, in this example source table element #5, and transforms it according to the corresponding module input configuration table element, in step 412, in this example module input configuration table element #5.

A function input configuration table 308, as described below with respect to an example TABLE 5, can be used to further refine the transformed value that resulted from applying the module input configuration table element. Entry #0 of the routing table corresponds to element #0 of the function input configuration table 308 and this one-to-one correspondence continues with all of the remaining entries and elements in the routing table and the function input configuration table 308. Thus, the transformed value resulting from applying element #5 of the module input configuration table 304 is further transformed, in step 412, by applying element #0 from the function input configuration table 308. Using the example of TABLE 5 below, element #0 is:

{AG_UINT32, AG_NO_BIT_MAN, 0u, 0u, AG_SF_ARRAY_00} wherein the first portion "AG_UINT32" represents a variable type of the variable gOp_int_inputs.ulBrs1 (whose address is element #0 of the vehicle function input table TABLE 2).

The result is that the initially transformed value is further transformed, i.e., recast from its original variable type of "32-bit floating" to a variable of type "32-bit unsigned integer". The transformed value can then be linked with the corresponding element from the vehicle function input table, in step 414. In particular, the transformed value can be stored in the memory location pointed to by the address from element #0 of the vehicle function input table.

If the VCM 200 were operating on the second vehicle then the routing table TABLE 4B would have been used. In this case, entry #0 of the routing table identifies "AG_IN_X10_DIGIN1" which corresponds to the enumerated index value #16 in the "Index of the Module Inputs" list. Thus, in this example, the value stored at element #16 in the Source Table, &USR_s_OV.ubX10DigIn1, would have been retrieved and transformed using element #16 from the module input configuration table 304, {AG_UINT8, AG_RIGHT, 0x01u, 0u, AG_SF_ARRAY_00}. This initial transformed value is also further transformed according to element #0 of the vehicle function configuration table (See TABLE 5 below, for example) such that the initial transformed value is further transformed by recasting the value from a variable type of "8-bit unsigned integer" to a variable of type "32-bit unsigned integer". This transformed value would then be stored, by the routing engine in the memory location pointed to by the address from element #0 of the vehicle function input table. Accordingly, the same vehicle function input, e.g., gOp_int_inputs.ulBrs1 would have been routed to and received different VCM inputs depending on which vehicle the VCM 200 was operating. In other words, some of the VCM inputs associated with routing table entries may be unique to either the first vehicle or the second vehicle.

In step 416, the routing engine determines if there are more routing table entries to process that match the calling process (e.g., PROCESS_SYS_MODELS). If so, then the routing engine sequentially repeats the above steps for each of the 25 routing table entries until it can wait at step 418.

As can be seen from TABLE 4A and TABLE 4B, the routing table entries for entry #8, #9 and #24 (among others) are the same. Thus, these entries correspond to VCM inputs that are the same for both the first and second vehicle or, in other words, are VCM inputs common to both types of vehicles.

In TABLE 4A, entry #3 refers to "AG_IN_NOT_USED_HIGH". This entry indicates that on this particular vehicle, there is no hardware provided that generates a value related to the corresponding vehicle function input: gOp_int_inputs.ulFps1 and a "default" value will be provided for the vehicle function input so that it has a well-defined value. The routing engine can determine (from the enumerated index) that AG_NOT_USED_HIGH corresponds to entry #1 and, therefore, retrieves the value stored at &ulAG_High. This value can be transformed using element #1 from the module input configuration table 304 and may be further transformed using element #3 of the function input configuration table 308, then the transformed value can be stored in the memory location pointed to by &gOp_int_inputs.ulFps1. In TABLE 4B, entry #15 is a similar entry and refers to "AG_NOT_USED_LOW". This entry results in a transformed value stored in the memory location pointed to by &gThrottleIn.Throttle_input_traction1.ulStart. Whether or not a HIGH value or a LOW value is appropriate depends on the logic of the processes that may utilize that vehicle function input. For example, if the vehicle function input refers to one of multiple switches that all must be HIGH for the vehicle to operate, then a vehicle that does not have an actual VCM input from a vehicle hardware device for that switch would associate the vehicle function input with "AG_NOT_USED_HIGH". Conversely, if the logic was configured that if any one of the switches were HIGH, the vehicle would be disabled, then a vehicle that does not have an actual VCM input from a vehicle hardware device for one of those switches would associate the vehicle function input with "AG_NOT_USED_LOW".

An example of the function input configuration table 308 is provided below as TABLE 5. As mentioned above, one example of a use for this table is to use the left-most portion of each element to help cast the data type of a variable value before storing the value at the address pointed to in the vehicle function input table 310. Accordingly, there is a one-to-one correspondence between the elements of the function input configuration table 308 and the vehicle function input table 310 as well as a one-to-one correspondence between the elements of the function input configuration table 308 and the entries of the routing tables 306.

The portions other than the left-most portion of each element of the function input configuration table 308 (See TABLE 5 directly below) could also be used to further transform a value that was initially transformed using the corresponding entry from the module input configuration table 304 as described above. For example, the structure of the elements of the two configuration tables (i.e., the module input configuration table TABLE 3, and the function input configuration table TABLE 5) can be similar such that further transformation of an initially transformed value can include scaling, adding an offset, applying a bit mask, shifting bits, or making no change at all. For example, element #22 in TABLE 5 includes a portion, "AG_SF_4_20_MA_INPUT" that indicates a corresponding initially transformed value should be further transformed using a particular pair of offset and scaling factors.

The VCM output values can, for example, relate to vehicle hardware device digital outputs, vehicle hardware device analog outputs, network formatted messages, and output drivers that interface with other modules on the vehicle. FIG. 3B illustrates a block-level view of switchboard tables including a routing table 324 used by the routing engine 238 to route vehicle function outputs from the control software 234 to VCM output memory locations in accordance with the principles of the present invention.

An example vehicle function output table 320 is provided below as TABLE 6 that includes a respective element or address for each of 10 different vehicle function output variables from the control software 234:

| Vehicle Function Output Table (Addresses) | Element No. |
|---|---|
| &gEd outputs.ulEdDriversOn, | 0 |
| &gTraction output.rBrake1Cmd, | 1 |
| &gTraction output.rBrake2Cmd, | 2 |
| &gTraction output.rBrake3Cmd, | 3 |
| &gTraction output.rTorqueCmd, | 4 |
| &gHyd output.ulSVML, | 5 |
| &gHyd output.ulSVMR, | 6 |
| &gHornBus.fHorn on, | 7 |
| &gSteer outputs.slMstrStrCmd, | 8 |
| &gSteer outputs.slSlvStrCmd, | 9 |

| Function Input Configuration Table | | | | Element No. |
|---|---|---|---|---|
| { AG UINT32, | AG NO BIT MAN, 0u, | 0u, AG SF ARRAY 00 }, | | 0 |
| { AG UINT32, | AG NO BIT MAN, 0u, | 0u, AG SF ARRAY 00 }, | | 1 |
| { AG UINT32, | AG NO BIT MAN, 0u, | 0u, AG SF ARRAY 00 }, | | 2 |
| { AG UINT32, | AG NO BIT MAN, 0u, | 0u, AG SF ARRAY 00 }, | | 3 |
| { AG UINT32, | AG NO BIT MAN, 0u, | 0u, AG SF ARRAY 00 }, | | 4 |
| { AG UINT32, | AG NO BIT MAN, 0u, | 0u, AG SF ARRAY 00 }, | | 5 |
| { AG UINT32, | AG NO BIT MAN, 0u, | 0u, AG SF ARRAY 00 }, | | 6 |
| { AG UINT32, | AG NO BIT MAN, 0u, | 0u, AG SF ARRAY 00 }, | | 7 |
| { AG FLOAT32, | AG NO BIT MAN, 0u, | 0u, AG SF ARRAY 00 }, | | 8 |
| { AG FLOAT32, | AG NO BIT MAN, 0u, | 0u, AG SF ARRAY 02 }, | | 9 |
| { AG INT32, | AG NO BIT MAN, 0u, | 0u, AG SF ARRAY 00 }, | | 10 |
| { AG INT32, | AG NO BIT MAN, 0u, | 0u, AG SF ARRAY 04 }, | | 11 |
| { AG UINT32, | AG NO BIT MAN, 0u, | 0u, AG SF ARRAY 00 }, | | 12 |
| { AG UINT32, | AG NO BIT MAN, 0u, | 0u, AG SF ARRAY 00 }, | | 13 |
| { AG FLOAT32, | AG NO BIT MAN, 0u, | 0u, AG SF ARRAY 05 }, | | 14 |
| { AG UINT32, | AG NO BIT MAN, 0u, | 0u, AG SF ARRAY 00 }, | | 15 |
| { AG FLOAT32, | AG NO BIT MAN, 0u, | 0u, AG SF ARRAY 11 }, | | 16 |
| { AG FLOAT32, | AG NO BIT MAN, 0u, | 0u, AG SF ARRAY 00 }, | | 17 |
| { AG FLOAT32, | AG NO BIT MAN, 0u, | 0u, AG SF ARRAY 00 }, | | 18 |
| { AG UINT32, | AG NO BIT MAN, 0u, | 0u, AG SF ARRAY 00 }, | | 19 |
| { AG FLOAT32, | AG NO BIT MAN, 0u, | 0u, AG SF ARRAY 00 }, | | 20 |
| { AG FLOAT32, | AG NO BIT MAN, 0u, | 0u, AG SF ARRAY 00 }, | | 21 |
| { AG FLOAT32, | AG NO BIT MAN, 0u, | 0u, AG SF 4 20MA INPUT }, | | 22 |
| { AG FLOAT32, | AG NO BIT MAN, 0u, | 0u, AG SF ARRAY 00 }, | | 23 |
| { AG UINT32, | AG NO BIT MAN, 0u, | 0u, AG SF ARRAY 00 }, | | 24 |

The applications or control software 234 executing on the VCM 200 not only utilize inputs but also produce outputs that can be routed to VCM output memory locations, which VCM output values are provided to the hardware structure of the hardware layer 246 that control vehicle hardware devices (e.g., a horn) or that provide settings to other modules such as a traction control module or a steering control module of the vehicle. Similar to the description above with respect to routing inputs, vehicle function output values from the control software 234 can be routed to corresponding VCM output variables or memory locations.

In particular, each element stores an address to a variable or memory location that stores one of 10 predetermined output values provided by the control software 234. The 10 values may not all be provided on both the first and second vehicle. While some of the output values may be provided by both vehicles, some of the output values may be unique to only one of the first or second vehicles.

An example vehicle function output configuration table 322 is provided below as TABLE 7 that includes a respective element for each of the 10 different vehicle function output variables of the vehicle function output table 320:

| Function Output Configuration Table | | | Element No. |
|---|---|---|---|
| { AG UINT32, | AG NO BIT MAN, 0u, | 0u, AG SF ARRAY 00 }, | 0 |
| { AG FLOAT32, | AG NO BIT MAN, 0u, | 0u, AG SF ARRAY 00 }, | 1 |
| { AG FLOAT32, | AG NO BIT MAN, 0u, | 0u, AG SF ARRAY 00 }, | 2 |
| { AG FLOAT32, | AG NO BIT MAN, 0u, | 0u, AG SF ARRAY 00 }, | 3 |
| { AG FLOAT32, | AG NO BIT MAN, 0u, | 0u, AG SF ARRAY 01 }, | 4 |
| { AG UINT32, | AG NO BIT MAN, 0u, | 0u, AG SF ARRAY 00 }, | 5 |
| { AG UINT32, | AG NO BIT MAN, 0u, | 0u, AG SF ARRAY 00 }, | 6 |
| { AG BOOLEAN, | AG NO BIT MAN, 0u, | 0u, AG SF ARRAY 00 }, | 7 |
| { AG INT32, | AG NO BIT MAN, 0u, | 0u, AG SF ARRAY 00 }, | 8 |
| { AG INT32, | AG NO BIT MAN, 0u, | 0u, AG SF ARRAY 00 }, | 9 |

The function output configuration table 322 has the same number of elements as the vehicle function output table 320 with each element of the function output configuration table 322 having a one-to-one correspondence with the same numbered element from the vehicle function output table 320. Each element of the function output configuration table 322 can include portions that relate to scaling a value, adding an offset, applying a bit mask, and bit shifting the values left or right similar to the techniques described above with respect to the function input configuration table 308.

Thus, an element from the function output configuration table 322 can be used to effect a first transformation of a value retrieved from a memory address of the corresponding element of the vehicle function output table 320. In addition, a first portion of each element from the function output configuration table 322 can identify a variable type associated with an address in the corresponding element of the vehicle function output table 320 while the other portions of the element may indicate that no transformation of the retrieved value is to occur. For example, element #2 of the function output configuration table 322 indicates that the variable gTraction_output.rBrake2Cmd (whose address is stored in element #2 of the vehicle function output table) is a variable of the type AG_FLOAT32 and the other portions of this element do not change the value of the variable. Thus, in some instances the value associated with the corresponding vehicle function output element does not necessarily need to be initially changed. In these instances, even though there may be a corresponding element in the function output configuration table, this element does not modify the corresponding value in any way and, thus, the value and the initially transformed value are actually the same.

An example module output configuration table 326 is provided below as TABLE 8 and has a respective element that corresponds to each of 26 different VCM output variables or memory locations.

| Module Output Configuration Table | | | | Element No. |
|---|---|---|---|---|
| { AG UINT32, | AG NO BIT MAN, | 0u, | 0u, AG SF ARRAY 00 }, | 0 |
| { AG FLOAT32, | AG NO BIT MAN, | 0u, | 0u, AG SF ARRAY 00 }, | 1 |
| { AG FLOAT32, | AG NO BIT MAN, | 0u, | 0u, AG SF ARRAY 00 }, | 2 |
| { AG FLOAT32, | AG NO BIT MAN, | 0u, | 0u, AG SF ARRAY 00 }, | 3 |
| { AG FLOAT32, | AG NO BIT MAN, | 0u, | 0u, AG SF ARRAY 00 }, | 4 |
| { AG FLOAT32, | AG NO BIT MAN, | 0u, | 0u, AG SF ARRAY 00 }, | 5 |
| { AG FLOAT32, | AG NO BIT MAN, | 0u, | 0u, AG SF ARRAY 00 }, | 6 |
| { AG FLOAT32, | AG NO BIT MAN, | 0u, | 0u, AG SF ARRAY 00 }, | 7 |
| { AG FLOAT32, | AG NO BIT MAN, | 0u, | 0u, AG SF ARRAY 00 }, | 8 |
| { AG FLOAT32, | AG NO BIT MAN, | 0u, | 0u, AG SF ARRAY 00 }, | 9 |
| { AG FLOAT32, | AG NO BIT MAN, | 0u, | 0u, AG SF ARRAY 00 }, | 10 |
| { AG FLOAT32, | AG NO BIT MAN, | 0u, | 0u, AG SF ARRAY 00 }, | 11 |
| { AG FLOAT32, | AG NO BIT MAN, | 0u, | 0u, AG SF ARRAY 00 }, | 12 |
| { AG FLOAT32, | AG NO BIT MAN, | 0u, | 0u, AG SF ARRAY 00 }, | 13 |
| { AG INT16, | AG NO BIT MAN, | 0u, | 0u, AG SF ARRAY 00 }, | 14 |
| { AG UINT16, | AG LEFT RMW, | 0x01u, | 0u, AG SF ARRAY 00 }, | 15 |
| { AG UINT16, | AG LEFT RMW, | 0x02u, | 1u, AG SF ARRAY 00 }, | 16 |
| { AG UINT16, | AG LEFT RMW, | 0x04u, | 2u, AG SF ARRAY 00 }, | 17 |
| { AG UINT16, | AG LEFT RMW, | 0x08u, | 3u, AG SF ARRAY 00 }, | 18 |
| { AG UINT16, | AG LEFT RMW, | 0x10u, | 4u, AG SF ARRAY 00 }, | 19 |
| { AG INT16, | AG NO BIT MAN, | 0u, | 0u, AG SF ARRAY 00 }, | 20 |
| { AG INT16, | AG NO BIT MAN, | 0u, | 0u, AG SF ARRAY 00 }, | 21 |
| { AG INT16, | AG NO BIT MAN, | 0u, | 0u, AG SF ARRAY 01 }, | 22 |
| { AG FLOAT32, | AG NO BIT MAN, | 0u, | 0u, AG SF ARRAY 00 }, | 23 |
| { AG FLOAT32, | AG NO BIT MAN, | 0u, | 0u, AG SF ARRAY 17 }, | 24 |
| { AG FLOAT32, | AG NO BIT MAN, | 0u, | 0u, AG SF ARRAY 00 }, | 25 |

Each element of the module output configuration table corresponds to a respective one of the VCM output address elements on a VCM or module output or destination table 328, Table 9 below. An element in the module output configuration table 326 provides data related to how to transform an associated vehicle function output value retrieved from a memory location pointed to by an address in the vehicle function output table 320 before that transformed value is stored in the memory location pointed to by the address in the corresponding element from the VCM output table 328. This transforming of a value can be transforming the value retrieved, i.e., the retrieved value was not previously transformed, or it can be a previously transformed value that was first transformed using an element of the function output configuration table 322, as described above. Similar to the input configuration table described earlier, transformations can include changing a variable type, scaling a value, adding an offset, applying a bit mask, and bit shifting the values left or right.

An example VCM output table 328 is provided below as TABLE 9:

| Module Outputs Table (Addresses) | Element No. |
|---|---|
| &ulAG Zero, | 0 |
| &grGP1 Command, | 1 |
| &gSupv Data.IO Interface.GP Interface[0].rCommand, | 2 |
| &gSupv Data.IO Interface.GP Interface[1].rCommand, | 3 |
| &gSupv Data.IO Interface.GP Interface[2].rCommand, | 4 |
| &gSupv Data.IO Interface.GP Interface[3].rCommand, | 5 |
| &gSupv Data.IO Interface.GP Interface[4].rCommand, | 6 |
| &gSupv Data.IO Interface.GP Interface[5].rCommand, | 7 |
| &gSupv Data.IO Interface.GP Interface[6].rCommand, | 8 |
| &gSupv Data.IO Interface.GP Interface[7].rCommand, | 9 |
| &gSupv Data.IO Interface.GP Interface[8].rCommand, | 10 |
| &gSupv Data.IO Interface.GP Interface[9].rCommand, | 11 |
| &gSupv Data.IO Interface.GP Interface[10].rCommand, | 12 |
| &gSupv Data.IO Interface.GP Interface[11].rCommand, | 13 |
| &USR_s OV.swTcmSpeedSetpoint, | 14 |
| &USR_s OV.uwTcmGPDriverControl, | 15 |
| &USR_s OV.uwTcmGPDriverControl, | 16 |
| &USR_s OV.uwTcmGPDriverControl, | 17 |
| &USR_s OV.uwTcmGPDriverControl, | 18 |
| &USR_s OV.uwTcmGPDriverControl, | 19 |
| &USR_s OV.swSteerCommandSetpoint1Deg100, | 20 |
| &USR_s OV.swSteerCommandSetpoint2Deg100, | 21 |
| &USR_s OV.swHcmSpeedSetpoint, | 22 |
| &grGP2 Command, | 23 |
| &grGP8 Command, | 24 |
| &grGPL1 Command, | 25 |

In the above example, there are 26 elements, each of which stores an address corresponding to a predetermined variable that stores a value to be output from the VCM 200, e.g., to a vehicle hardware device. The 26 elements comprise a superset comprising a first set of elements corresponding to VCM outputs or output values provided on the first vehicle and a second set of elements corresponding to VCM outputs or output values provided on the second vehicle. The outputs or output values available for each vehicle depend in part on the hardware devices that are provided by that vehicle. The two sets of elements that make up the superset can have common elements corresponding to VCM output values common to both vehicles as well as one or more elements corresponding to VCM output values that are unique to one of the first and second vehicles. Each of the elements of the VCM output table 328 can be a memory address, and, therefore, the VCM output table 328, also referred to herein as a module output table, comprises a superset of module output elements.

Two different example routing table are provided below as TABLE 10A and TABLE 10B:

| Output Routing Table (Vehicle #1) | | Entry No. |
|---|---|---|
| { PROCESS_SYS_MODEL, AG_OUT_GP1_COMMAND | }, | 0 |
| { PROCESS_SYS_MODEL, AG_OUT_SUPV_GP9_COMMAND | }, | 1 |
| { PROCESS_SYS_MODEL, AG_OUT_SUPV_GP10_COMMAND | }, | 2 |
| { PROCESS_SYS_MODEL, AG_OUT_SUPV_GP11_COMMAND | }, | 3 |
| { PROCESS_SYS_MODEL, AG_OUT_TXN_SPEED_SETPOINT | }, | 4 |
| { PROCESS_SYS_MODEL, AG_OUT_TCM_GP3_COMMAND | }, | 5 |
| { PROCESS_SYS_MODEL, AG_OUT_TCM_GP5_COMMAND | }, | 6 |
| { PROCESS_SYS_MODEL, AG_OUT_SUPV_GP8_COMMAND | }, | 7 |
| { PROCESS_SYS_MODEL, AG_OUT_SCM_COMMAND_SETPOINT1 | }, | 8 |
| { PROCESS_SYS_MODEL, AG_OUT_SCM_COMMAND_SETPOINT2 | }, | 9 |

| Output Routing Table (Vehicle #2) | | Entry No. |
|---|---|---|
| { PROCESS_SYS_MODEL, AG_OUT_GP1_COMMAND | }, | 0 |
| { PROCESS_SYS_MODEL, AG_OUT_SUPV_GP10_COMMAND | }, | 1 |
| { PROCESS_SYS_MODEL, AG_OUT_NOT_USED | }, | 2 |

| Output Routing Table (Vehicle #2) | | Entry No. |
|---|---|---|
| { PROCESS SYS MODEL, AG OUT NOT USED | }, | 3 |
| { PROCESS SYS MODEL, AG OUT TXN SPEED SETPOINT | }, | 4 |
| { PROCESS SYS MODEL, AG OUT TCM GP4 COMMAND | }, | 5 |
| { PROCESS SYS MODEL, AG OUT NOT USED | }, | 6 |
| { PROCESS SYS MODEL, AG OUT SUPV GP8 COMMAND | }, | 7 |
| { PROCESS SYS MODEL, AG OUT SCM COMMAND SETPOINT1 | }, | 8 |
| { PROCESS SYS MODEL, AG OUT SCM COMMAND SETPOINT2 | }, | 9 |

Each of the routing tables has 10 entries which correspond to the 10 vehicle function output elements in the vehicle function output table 320 and the 10 configuration elements of the function output configuration table 322. The two example routing tables shown above are customized for the particular type of vehicle on which it is installed. The configuration tables 322 and 326 may also be customized for the particular vehicle type on which they are installed. These routing and configuration tables allow the same VCM output table 328 and the same vehicle function output table 320 to be used on different types of vehicles that have different hardware devices. For example, entries #1-#3 of TABLE 10A indicate that the first vehicle includes VCM outputs corresponding to 3 different brake commands that can be output from the control software 234 but the same entries from the routing table TABLE 10B indicate that two of the brake commands do not correspond to implemented VCM outputs on the second vehicle. In contrast, entry #7 indicates that both vehicles have a VCM output that corresponds to a "horn on" command output from the control software 234.

For routing outputs, an enumerated index is defined that includes a value for each element in the VCM output table 328 and the module output configuration table 326. One example index is provided below that includes 26 elements:

| Index of the Module Outputs | Index No. |
|---|---|
| AG OUT NOT USED = 0, | 0 |
| AG OUT GP1 COMMAND, | 1 |
| AG OUT SUPV GP1 COMMAND, | 2 |
| AG OUT SUPV GP2 COMMAND, | 3 |
| AG OUT SUPV GP3 COMMAND, | 4 |
| AG OUT SUPV GP4 COMMAND, | 5 |
| AG OUT SUPV GP5 COMMAND, | 6 |
| AG OUT SUPV GP6 COMMAND, | 7 |
| AG OUT SUPV GP7 COMMAND, | 8 |
| AG OUT SUPV GP8 COMMAND, | 9 |
| AG OUT SUPV GP9 COMMAND, | 10 |
| AG OUT SUPV GP10 COMMAND, | 11 |
| AG OUT SUPV GP11 COMMAND, | 12 |
| AG OUT SUPV GP12 COMMAND, | 13 |
| AG OUT TXN SPEED SETPOINT, | 14 |
| AG OUT TCM GP1 COMMAND, | 15 |
| AG OUT TCM GP2 COMMAND, | 16 |
| AG OUT TCM GP3 COMMAND, | 17 |
| AG OUT TCM GP4 COMMAND, | 18 |
| AG OUT TCM GP5 COMMAND, | 19 |
| AG OUT SCM COMMAND SETPOINT1, | 20 |
| AG OUT SCM COMMAND SETPOINT2, | 21 |
| AG OUT HYD SPEED SETPOINT, | 22 |
| AG OUT GP2 COMMAND, | 23 |
| AG OUT GP8 COMMAND, | 24 |
| AG OUT GPL1 COMMAND, | 25 |

As described above with respect to routing inputs, the routing engine can use a routing table entry to determine an index value from the enumerated index and use that index value to identify an appropriate element in the VCM output table 328 and the module output configuration table 326.

Figure 5:
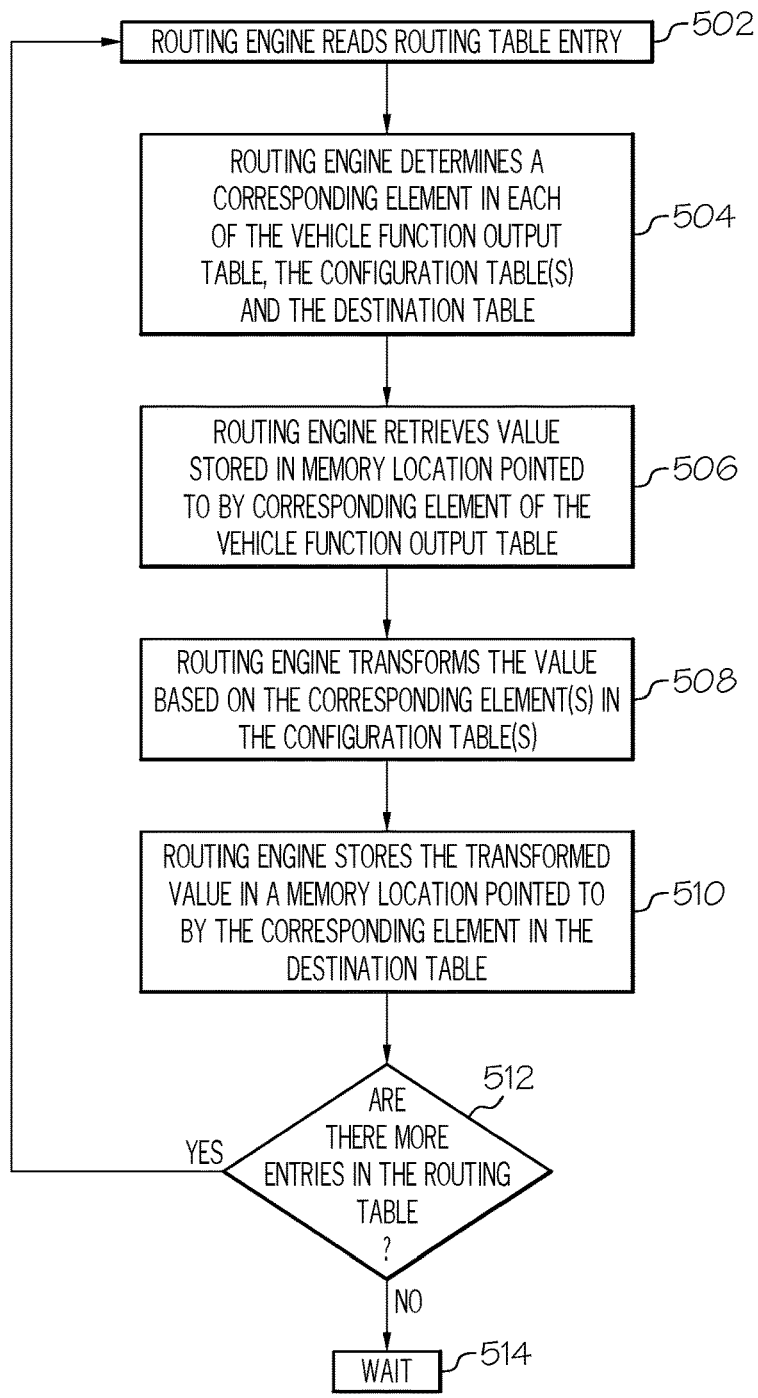
FIG. 5 is a flowchart of an example method for routing vehicle function outputs to VCM outputs in accordance with the principles of the present invention.

FIG. 5 is a flowchart of an example method for routing vehicle function outputs from the control software 234 to VCM output memory locations in accordance with the principles of the present invention. The operation of the routing engine 238 routing outputs is substantially similar to the method described with respect to the flowchart of FIG. 4. In step 502, the routing engine 238 reads an entry in one of the output routing tables 10A or 10B. Based on that entry, the routing engine, in step 504, can determine a corresponding element in the VCM output table 328, the module output configuration table 326, the function output configuration table 322, and the vehicle function output table 320. The corresponding element from the tables 326 and 328 are based on the enumerated index value associated with the routing table entry and the corresponding elements in tables 320 and 322 depend on the index of the routing table entry currently being processed.

For example, if the routing engine 238 were in a VCM 200 operating on the first vehicle and is presently processing entry #5, then the routing engine 238 can also retrieve the address from element #5 of the vehicle function output table 320 which, in this example, would be &gHyd_output.ulS-VML and also retrieve element #5 from the function output configuration table 322 which, in this example, would be {AG_UINT32, AG_NO_BIT_MAN, 0u, 0u, AG_SF_ARRAY_00} Using this address from the vehicle function output table 320, the routing engine can then access the actual value that is stored at that address. The routing engine 238 can also extract AG_OUT_TCM_GP3_COMMAND from entry #5 of TABLE 10A and then use this extracted value as an index into the VCM output table 328 and the output configuration table 326. Based on the example "Index of Module Outputs" enumerated index defined above, AG_OUT_TCM_GP3_COMMAND corresponds to index #17. Accordingly, the routing engine, using the index, can retrieve element #17 from the module output table 328 (i.e., the address &USR_s_OV.uwTcmGPDriverControl) and element #17 from the module output configuration table 326 (i.e., {AG_UINT16, AG_LEFT_RMW, 0x04u, 2u, AG_SF_ARRAY_00}).

Thus, using the address in the corresponding element from the vehicle function output table 320 (i.e., &gHyd_output.ulSVML), the routing engine, in step 506, retrieves the value stored at that memory location and transforms it, in step 508, according to a) the corresponding element from the function output configuration table 322 (i.e., {AG_UINT32, AG_NO_BIT_MAN, 0u, 0u, AG_SF_ARRAY_00}) and b) the corresponding element of the module output configuration table 326 (i.e., {AG_UINT16, AG_LEFT_RMW, 0x04u, 2u, AG_SF_ARRAY_00}). Accordingly, in this example, the element from the function output configuration table 322 results in no initial transformation of the retrieved value, while the element from the module output configuration table 326 indicates that the retrieved value is recast from a variable of type "32-bit unsigned integer" to "16-bit unsigned integer", bit masked with "0000 0100", and bit shifted to the left by "2" bits in order to generate a transformed value. Using the address in the corresponding element from the VCM output table 328 (i.e., the address &USR_s_OV.uwTcmGPDriverControl), the routing engine, in step 510, stores the transformed value in that memory location. In step 512, the routing engine determines if there are more routing table entries to process that match the calling process (e.g., PROCESS_SYS_MODELS). If so, then the routing engine sequentially repeats the above steps for each of the 10 routing table entries until it can wait at step 514.

When routing outputs, two different "not-used" values may not be necessary as the VCM output variable ulAG_zero will not be used to produce an output from the VCM 200. Accordingly, the example enumerated index for the outputs has a single element "AG_OUT_NOT_USED" that can be referred to by the output routing table for vehicle function output values that are not utilized by the vehicle on which that output routing table is installed.

One alternative to the source, or module input, table 302 described above involves using a data structure that is purposefully constructed for all of the VCM application layer inputs or input values so as to store those inputs or input values in corresponding VCM or module input variables or memory locations, using predetermined variable or memory location names. These variable names are those defined by the various processes of the application layer 230 of the VCM 200 to store values related to all the possible inputs that the application layer 230 of the VCM 200 could receive from both the first and second sets of vehicle hardware devices. These inputs can include, for example, digital input values, analog input values, network messages and packets (e.g., CAN messages, IP packets, etc.), encoder inputs, and other inputs (e.g., 4-20 ma loop).

A "struct" in the C programming language (and many other languages) is a complex, or composite, data type declaration that defines a data structure comprising a physically grouped list of variables to be placed under one name in a block of memory, allowing the different variables to be accessed via a single pointer (i.e., an address). For example, the "address of" operator (i.e., "&") applied to the struct's declared name returns that address. The members, or member variables, of a struct can be many other complex and simple data types in association with one another. The C struct data type references a contiguous block of physical memory, usually delimited by word-length boundaries. However, various compiler implementations could utilize half-word or byte boundaries that would allow denser packing and, thus, use less memory. Accordingly, the alignment of the particular members of the struct, with respect to word boundaries, is implementation-specific and may include padding. Because the struct data type references a block of contiguous memory, each member variable within is located a fixed offset, or offset amount, from the index zero reference (i.e., the address, or pointer, of the struct).

The following code snippet defines a data type "module_input_struct_t" for a data structure (also referred to herein as a "module input data structure") that has 37 member variables (also referred to herein as "VCM or module input variables") corresponding to the 37 addresses or elements that were in the source table 302, and in the same order:

```
typedef   struct   module_input_struct
{
    UINT32 t        ulAG Low;
    UINT32 t        ulAG High;
    FLOAT32 t       Switch[SDI SW
                    DRV1].Control.rSwitchDriverOutput;
    FLOAT32 t       Switch[SDI SW
                    DRV2].Control.rSwitchDriverOutput;
    FLOAT32 t       Switch[SDI SW
                    DRV3].Control.rSwitchDriverOutput;
    FLOAT32 t       Switch[SDI SW
                    DRV4].Control.rSwitchDriverOutput;
    FLOAT32 t       Switch[SDI SW
                    DRV5].Control.rSwitchDriverOutput;
    FLOAT32 t       Switch[SDI SW
                    DRV6].Control.rSwitchDriverOutput;
    FLOAT32 t       Switch[SDI SW
                    DRV7].Control.rSwitchDriverOutput;
    FLOAT32 t       Switch[SDI SW
                    DRV8].Control.rSwitchDriverOutput;
    INT16 t         USR s OV.swTcmRxMotorSpeedRPM;
    INT16 t         USR s OV.swTcmRxTorqueAchievedNM;
    UINT32 t        AnalogInputs[1].ulCounts;
    UINT32 t        Supv Data.IO Interface.uPot2 Wiper Counts;
    UINT32 t        AnalogInputs[40].ulCounts;
    UINT32 t        AnalogInputs[41].ulCounts;
    UINT8 t         USR s OV.ubX10DigIn1;
    UINT8 t         USR s OV.ubX10DigIn1;
    UINT8 t         USR s OV.ubX10DigIn1;
    UINT8 t         USR s OV.ubX10DigIn1;
    UINT8 t         USR s OV.ubX10DigIn1;
    UINT8 t         USR s OV.ubX10DigIn1;
    UINT8 t         USR s OV.ubX10DigIn1;
    UINT8 t         USR s OV.ubX10DigIn1;
    INT16 t         USR s OV.swDriveUnitPositionDeg100fb1;
    INT16 t         USR s OV.swDriveUnitPositionDeg100fb2;
    INT16 t         USR s OV.swSteeringFeedBackRPM;
    INT16 t         USR s OV.swMotorCurrent;
    UINT8 t         USR s OV.ubStopTraction;
    FLOAT32 t       AnalogInputs[0].rScaledUnits;
    FLOAT32 t       AnalogInputs[1].rScaledUnits;
    FLOAT32 t       AnalogInputs[2].rScaledUnits;
    FLOAT32 t       AnalogInputs[3].rScaledUnits;
    FLOAT32 t       AnalogInputs[4].rScaledUnits;
    FLOAT32 t       AnalogInputs[5].rScaledUnits;
    INT32 t         Quadrature1.slCounts;
    FLOAT32 t       EnergySource output.rBatteryAh;
} module_input_struct_t;
```

In the above data structure definition, the left column provides a declaration of each member variable's respective data type and the right column is the label or name of that member variable corresponding to one of the predetermined VCM or module input variables. This typedef can then be used to create an instance of the defined structure in memory. For example, the following line of code creates a data structure instance, or variable, labeled "sModule_Inputs":

static module_input_struct_t sModule_Inputs;

Thus, memory space is reserved for each member variable of the data structure. The starting address for this data structure instance in memory is represented by &sModule_Inputs and all the member variables are located sequentially in memory in the order they are listed in the structure definition.

Figure 6:
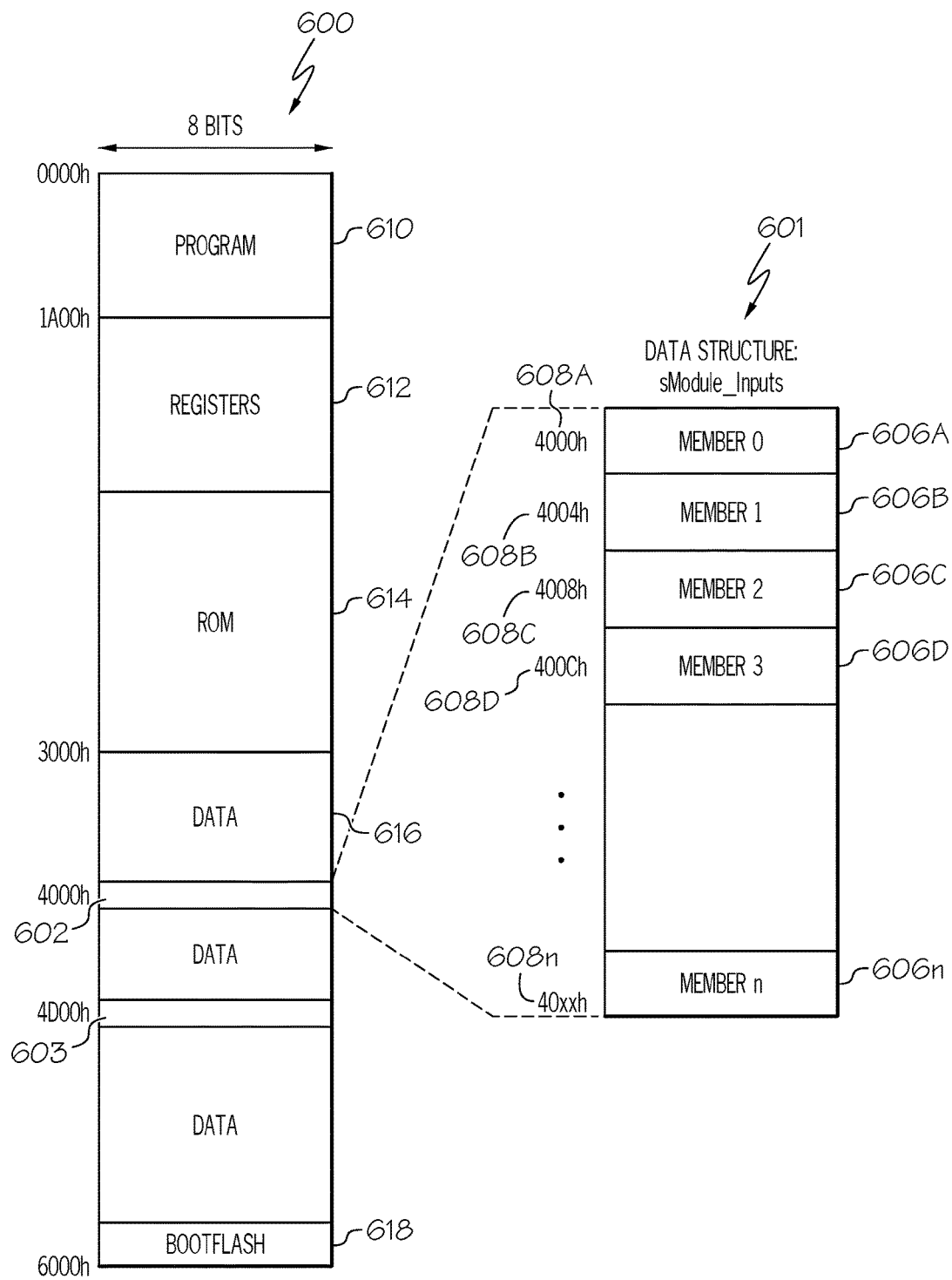
FIG. 6 depicts a conceptual view of a data structure stored in memory in accordance with the principles of the present invention.

FIG. 6 illustrates a conceptual view of a map of memory space that the processor 216 can address. For example purposes only, the map 600 is considered to be 8-bits wide so that the addresses along the left hand side of the map 600 refer to sequential bytes of memory. In the example memory map 600, there is a program address range 610 that stores instructions to be executed by the processor 216 and there is a data address range 616 that stores data used or produced by the executing instructions. One of ordinary skill will recognize that other address ranges may be utilized that allow the processor 216 to read/write other data such as a range 612 related to registers, a range 614 related to a read only memory (ROM), and/or a range 618 related to a boot area.

When the data structure instance sModule_Inputs 601 is created, it can, for example, be stored in memory starting at an address 4000h. In the memory map 600, this address is represented by the section 602. A contiguous block of memory is allocated to the data structure 601 starting at an address 608A. The first member variable 606A (member #0) of the data structure is stored at that starting address 608A and each subsequent member variable 606B, 606C, 606D is stored in memory at a respective address 608B, 608C, 608D that is offset from the starting address 608A. In the example of FIG. 6, each member variable (e.g., 606A-606D) has 4 bytes allocated for its storage and so the addresses 608B-608D grow by "4" each step. However, as mentioned above, the amount of bytes allocated to a particular variable type can be determined, for example, by a compiler and fewer than 4 bytes or more than 4 bytes could be allocated to a particular member variable. The "offset", or "offset amount" of a member variable 606A-606D is the difference between its starting address and the starting address of the data structure instance (e.g., 4000h). For a data structure instance that has n members there is a final member 606n that is stored at an address 608n starting at an address 40xxh.

A "module input offset table" can be constructed, or provided, by the VCM 200 which includes an element for each of the superset of VCM application layer inputs or input values that may be provided by the first vehicle and the second vehicle. The module input offset table in the illustrated example is the same or substantially the same in the VCMs provided for the first and second vehicles.

The following example code snippet is used in the illustrated embodiment to create a module input offset table that has an element corresponding to each member variable or module input variable of the sModule_Inputs data structure 601 and assigns a value to each element with the value of each element being an offset amount associated with its corresponding member variable:

```
static      uint16_t    suwAG_ModuleInputOffsetArray[37] =
{
        offsetof(module_input_struct_t, ulAG_Low),
        offsetof(module_input_struct_t, ulAG_High),
        offsetof(module_input_struct_t, Switch[SDI_SW_DRV1].Control.rSwitchDriverOutput),
        offsetof(module_input_struct_t, Switch[SDI_SW_DRV2].Control.rSwitchDriverOutput),
        offsetof(module_input_struct_t, Switch[SDI_SW_DRV3].Control.rSwitchDriverOutput),
        offsetof(module_input_struct_t, Switch[SDI_SW_DRV4].Control.rSwitchDriverOutput),
        offsetof(module_input_struct_t, Switch[SDI_SW_DRV5].Control.rSwitchDriverOutput),
        offsetof(module_input_struct_t, Switch[SDI_SW_DRV6].Control.rSwitchDriverOutput),
        offsetof(module_input_struct_t, Switch[SDI_SW_DRV7].Control.rSwitchDriverOutput),
        offsetof(module_input_struct_t, Switch[SDI_SW_DRV8].Control.rSwitchDriverOutput),
        offsetof(module_input_struct_t, USR_s_OV.swTcmRxMotorSpeedRPM),
        offsetof(module_input_struct_t, USR_s_OV.swTcmRxTorgueAchievedNM),
        offsetof(module_input_struct_t, AnalogInputs[1].ulCounts),
        offsetof(module_input_struct_t, Supv_Data.IO_Interface.uPot2_Wiper_Counts),
        offsetof(module_input_struct_t, AnalogInputs[40].ulCounts),
        offsetof(module_input_struct_t, AnalogInputs[41].ulCounts),
        offsetof(module_input_struct_t, USR_s_OV.ubX10DigIn1),
        offsetof(module_input_struct_t, USR_s_OV.ubX10DigIn1),
        offsetof(module_input_struct_t, USR_s_OV.ubX10DigIn1),
        offsetof(module_input_struct_t, USR_s_OV.ubX10DigIn1),
        offsetof(module_input_struct_t, USR_s_OV.ubX10DigIn1),
        offsetof(module_input_struct_t, USR_s_OV.ubX10DigIn1),
        offsetof(module_input_struct_t, USR_s_OV.ubX10DigIn1),
        offsetof(module_input_struct_t, USR_s_OV.ubX10DigIn1),
        offsetof(module_input_struct_t, USR_s_OV.swDriveUnitPositionDeg100fb1),
        offsetof(module_input_struct_t, USR_s_OV.swDriveUnitPositionDeg100fb2),
        offsetof(module_input_struct_t, USR_s_OV.swSteeringFeedBackRPM),
        offsetof(module_input_struct_t, USR_s_OV.swMotorCurrent),
        offsetof(module_input_struct_t, USR_s_OV.ubStopTraction),
        offsetof(module_input_struct_t, AnalogInputs[0].rScaledUnits),
        offsetof(module_input_struct_t, AnalogInputs[1].rScaledUnits),
        offsetof(module_input_struct_t, AnalogInputs[2].rScaledUnits),
        offsetof(module_input_struct_t, AnalogInputs[3].rScaledUnits),
        offsetof(module_input_struct_t, AnalogInputs[4].rScaledUnits),
        offsetof(module_input_struct_t, AnalogInputs[5].rScaledUnits),
        offsetof(module_input_struct_t, Quadrature1.slCounts),
        offsetof(module_input_struct_t, EnergySource_output.rBatteryAh),
};
```

For example, when the above code snippet is compiled to assign values to each element of the table and the compiler reaches the following portion (e.g., the second to last line): offsetof(module_input_struct_t, Quadrature1.slCounts) it evaluates to a number corresponding to the offset of the variable Quadrature1.slCounts within the data structure type definition module_input_struct_t. In the example embodiment above, this member variable is the $36^{th}$ variable (i.e., member #35) of the 37 member variables and, assuming each member variable is allocated 4 bytes, then its offset is 35×4 which in hexadecimal is 008 Ch. Accordingly, its value in the module input offset table would evaluate to 008 Ch. Because of the data type specified for the module input offset table (i.e., uint16_t), each element of the module input offset table is considered to be an integer and can be used to calculate an address value, as discussed below. One of ordinary skill will recognize that the above declaration statement for the module input offset table could include additional parameters, such as "const", as shown below:

static const uint16_t suwAG_ModuleInputOffsetArray [37]=to locate the module input offset table in a particular region of the memory map such as the program address range 610 rather than the data address range 616.

Based on the assumptions discussed above with respect to the memory size allocated for each member variable and there being 37 module input variables, an example module input offset table that could be constructed by compiling the above code snippet is shown as TABLE 11 below:

| Module Input Offset Table (Offsets) | Element No. |
|---|---|
| 0000h | 0 |
| 0004h | 1 |
| 0008h | 2 |
| 000Ch | 3 |
| 0010h | 4 |
| 0014h | 5 |
| 0018h | 6 |
| 001Ch | 7 |
| 0020h | 8 |
| 0024h | 9 |
| 0028h | 10 |
| 002Ch | 11 |
| 0030h | 12 |
| 0034h | 13 |
| 0038h | 14 |
| 003Ch | 15 |
| 0040h | 16 |
| 0044h | 17 |
| 0048h | 18 |
| 004Ch | 19 |
| 0050h | 20 |
| 0054h | 21 |
| 0058h | 22 |
| 005Ch | 23 |
| 0060h | 24 |
| 0064h | 25 |
| 0068h | 26 |
| 006Ch | 27 |
| 0070h | 28 |
| 0074h | 29 |
| 0078h | 30 |
| 007Ch | 31 |
| 0080h | 32 |
| 0084h | 33 |
| 0088h | 34 |
| 008Ch | 35 |
| 0090h | 36 |

Figure 7A:
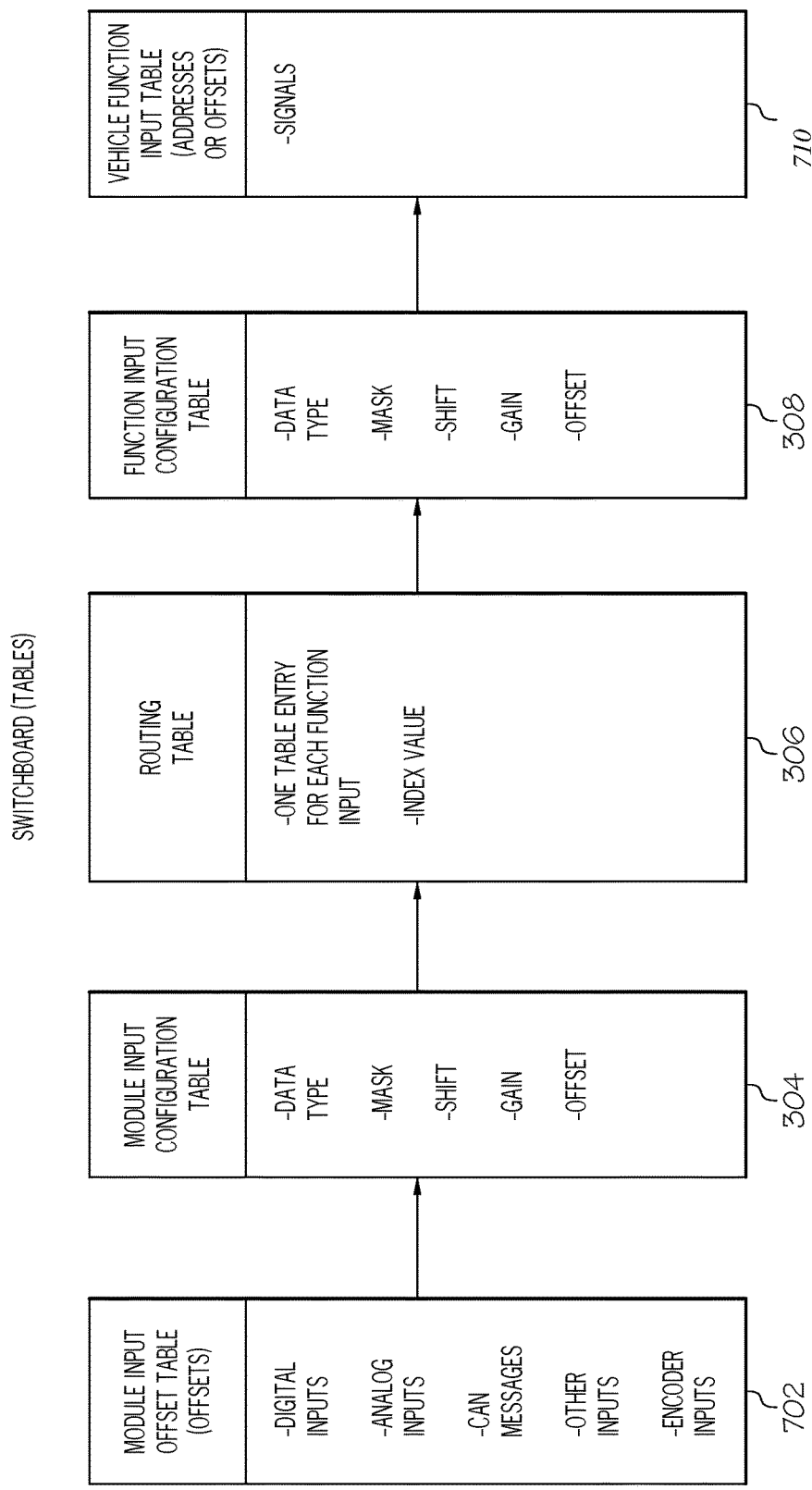
FIG. 7A illustrates a block-level view of other switchboard tables used to route VCM inputs to vehicle function inputs in accordance with the principles of the present invention.

A module input offset table 702 is depicted in FIG. 7A and can be used as a substitute for the source table 302 shown in FIG. 3A. As a result, substantially all of the steps of the flowchart of FIG. 4 can also be used with this second embodiment but the step 404 is modified. Each of the elements of the module input offset table 702 can be an offset or an offset amount of a corresponding member variable or module offset variable within sModule_Inputs data structure 601 and, therefore, the module input offset table 702, also referred to herein as a module input table, comprises a superset of module input elements that are each an integer value. Element numbers 0-36 in the Module Input Offset Table correspond in the same order to the names of the module input variables in the code snippet above defining the "module_input_struct_t".

Figure 8:
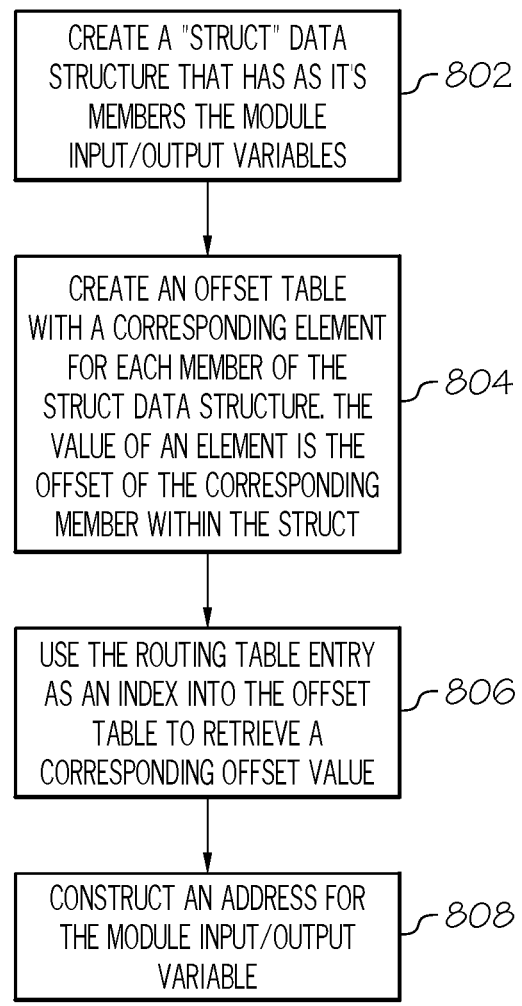
FIG. 8 is a flowchart of an example method for linking VCM inputs/outputs with vehicle function inputs/outputs in accordance with the principles of the present invention.

FIG. 8 is a flowchart of an example portion of an alternative method for linking VCM inputs/outputs with vehicle function inputs/outputs in accordance with the principles of the present invention. With respect to linking VCM inputs with vehicle function inputs, a module input data structure is created in memory, in step 802, that comprises a superset of VCM or module input variables or memory locations, wherein the superset of module input variables comprises a first subset of module input variables related to a first set of hardware devices provided on the first vehicle and a second subset of module input variables related to a second set of hardware devices provided on the second vehicle. In particular, the data structure created can be a "struct" with each of its member variables corresponding to one of the module input variables. Next, in step 804, a module input offset table is created that comprises a set of input offset elements, wherein each input offset element corresponds to one of the superset of module input variables and comprises an offset amount of the corresponding module input variable within the module input data structure.

As described above with respect to the flowchart of FIG. 4, the routing engine begins in step 402 by reading the first entry of the routing table 306 and, based on the entry, determines, in step 404, a corresponding element in the source table 302. Instead of performing step 404, the algorithm of FIG. 8 uses the routing table entry as an index into the module input offset table 702 and determines, in step 806, a corresponding element in the module input offset table 702.

If the first vehicle routing table TABLE 4A is used, then the routing engine 238 determines that routing table entry #0 identifies "AG_IN_SWITCH4" and based on the enumerated index i.e., index of module inputs, this corresponds to index value #5 in the "Index of the Module Inputs" list and element #5 in the module input offset table 702, which corresponds to an offset amount 0014h. In step 808, an address can be constructed using the sModule_Inputs data structure that is stored in memory. In particular, an address can be constructed that adds the offset value 0014h (i.e., suwAG_ModuleInputOffsetArray[5]) with the address of the sModule_Inputs data structure or data structure variable (e.g. 04000h) to arrive at an example address 04014h. A value can be read by the routing engine (in step 410) at this constructed composite address rather than the address retrieved from a source table 302 to determine the value associated with the module input variable Switch[SDI_SW_DRV4].Control.rSwitchDriverOutput.

Steps 406, 408, 412, 414, 416 and 418 of the flowchart of FIG. 4 are the same whether the source table 302, or the module input offset table 702, is used to determine an address of a module input variable.

As one alternative to the vehicle function input table 310, wherein each vehicle function input element was a memory address to a variable or memory location that stores a value that can be utilized by the control software 234 for the vehicle on which the VCM is operating, a vehicle function input table 710 can be used wherein each vehicle function input element may be either a memory address as in table 310 or an offset. In a manner analogous to how the module input offset table was constructed with a respective offset value for the member variables of the module input data structure, the vehicle function input table 710 could be constructed so that each element is an offset amount. Thus, each vehicle function input element would be a respective offset amount associated with the member variables of a data structure that includes as its member variables the 25 vehicle function input variables whose addresses are referred to in TABLE 2 above.

Figure 7B:
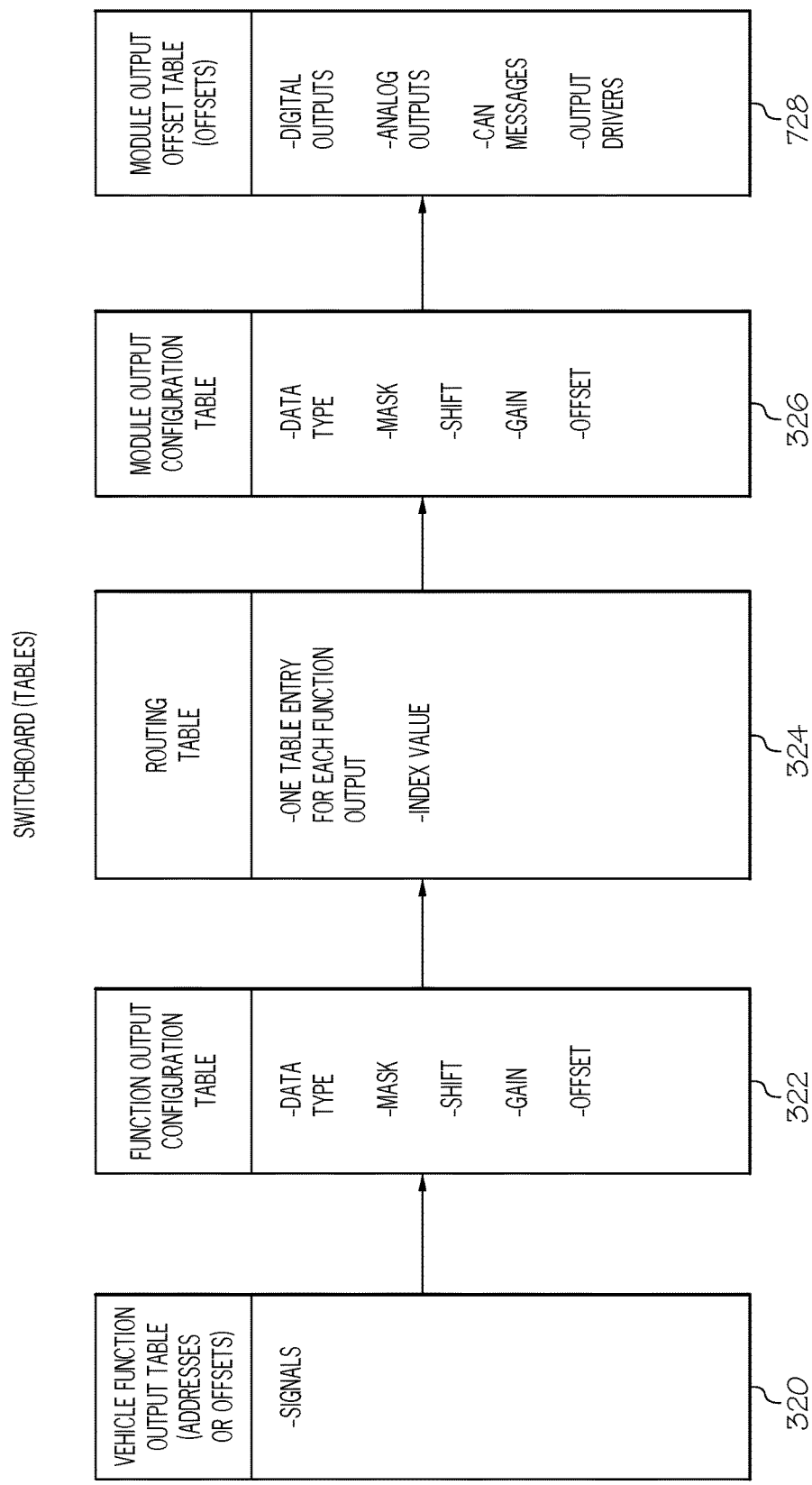
FIG. 7B illustrates a block-level view of other switchboard tables used to route vehicle function outputs to VCM outputs in accordance with the principles of the present invention.

Similar to the alternative switchboard module input offset table 702 described above, a module output offset table 728, as shown in FIG. 7B, can be substituted for the destination table 328 of FIG. 3B and used to link vehicle function outputs or output values from the control software 234 to vehicle module output variables or memory locations. One alternative to the destination, or module output, table 328 described above involves using a data structure that is purposefully constructed for all of the VCM application layer outputs, i.e., the module output variables, using predetermined variable names. These variable names are those defined by the various processes of the application layer 230 of the VCM 200 to store values related to the output devices and hardware of the vehicle 10, such as vehicle hardware device digital outputs, vehicle hardware device analog outputs, network formatted messages, and output drivers that interface with other modules on the vehicle.

The following code snippet defines a data type "module_output_struct_t" for a data structure that has 26 member variables corresponding to the 26 addresses or elements that were in the destination table 328, and in the same order:

```
typedef  struct     module_output_struct
{
    UINT32 t        ulAG Zero;
    FLOAT32 t       rGP1 Command;
    FLOAT32 t       Supv Data.IO Interface.GP
                    Interface[0].rCommand;
    FLOAT32 t       Supv Data.IO Interface.GP
                    Interface[1].rCommand;
    FLOAT32 t       Supv Data.IO Interface.GP
                    Interface[2].rCommand;
    FLOAT32 t       Supv Data.IO Interface.GP
                    Interface[3].rCommand;
    FLOAT32 t       Supv Data.IO Interface.GP
                    Interface[4].rCommand;
    FLOAT32 t       Supv Data.IO Interface.GP
                    Interface[5].rCommand;
    FLOAT32 t       Supv Data.IO Interface.GP
                    Interface[6].rCommand;
    FLOAT32 t       Supv Data.IO Interface.GP
                    Interface[7].rCommand;
    FLOAT32 t       Supv Data.IO Interface.GP
                    Interface[8].rCommand;
    FLOAT32 t       Supv Data.IO Interface.GP
                    Interface[9].rCommand;
    FLOAT32 t       Supv Data.IO Interface.GP
                    Interface[10].rCommand;
    FLOAT32 t       Supv Data.IO Interface.GP
                    Interface[11].rCommand;
    UINT16 t        USR s OV.swTcmSpeedSetpoint;
    UINT16 t        USR s OV.uwTcmGPDriverControl;
    UINT16 t        USR s OV.uwTcmGPDriverControl;
    UINT16 t        USR s OV.uwTcmGPDriverControl;
    UINT16 t        USR s OV.uwTcmGPDriverControl;
    UINT16 t        USR s OV.uwTcmGPDriverControl;
    INT16 t         USR s OV.swSteerCommandSetpoint1Deg100;
    INT16 t         USR s OV.swSteerCommandSetpoint2Deg100;
    INT16 t         USR s OV.swHcmSpeedSetpoint;
    FLOAT32 t       rGP2 Command;
    FLOAT32 t       rGP8 Command;
    FLOAT32 t       rGPL1 Command;
} module_output_struct_t;
```

In the above data structure definition, the left column provides a declaration of each member variable's respective data type and the right column is the label or name of that member variable corresponding to one of the predetermined module output variables. This typedef can be used to create an instance of the defined structure in memory. For example, the following line of code creates a data structure instance, or variable, labeled "sModule_Outputs": static module_output_struct_t sModule_Outputs; Thus, memory space is reserved for each member of the data structure. The starting address for this data structure instance in memory is represented by &sModule_Outputs and all the members are located sequentially in memory in the order they are listed in the structure definition.

Returning to the memory map 600 of FIG. 6, when the data structure instance sModule_Outputs is created, it can, for example, be stored in memory starting at an address in memory having an address 4D00h. In the memory map 600, this address is represented by the section 603. The sModule Outputs data structure is stored in memory similar to the sModule_Inputs data structure described earlier with the first member variable or module output variable (member #0) of the sModule_Outputs data structure being stored at that starting address 4D00h and each subsequent member variable or module output variable being stored in memory at a respective address that is offset from the starting address 4D00h.

A "module output offset table" can be constructed, or provided, by the VCM 200 which includes an element for each of the superset of VCM application layer outputs or output values that may be provided for the first vehicle and the second vehicle. The module output offset table in the illustrated example is the same or substantially the same in the VCMs provided for the first and second vehicles.

The following example code snippet is used in the illustrated embodiment to create a module output offset table that has an element corresponding to each member variable or module output variable of the sModule_Outputs data structure and assigns a value to each element with the value of each element being an offset amount associated with its corresponding member variable or module output variable:

```
static    uint16_t    suwAG_ModuleOutputOffsetArray[26] =
{
    offsetof(module_output_struct_t, ulAG Zero),
    offsetof(module_output_struct_t, rGP1 Command),
    offsetof(module_output_struct_t,Supv_Data.IO_Interface.GP_Interface[0].rCommand),
    offsetof(module_output_struct_t,Supv_Data.IO_Interface.GP_Interface[1].rCommand),
    offsetof(module_output_struct_t,Supv_Data.IO_Interface.GP_Interface[2].rCommand),
    offsetof(module_output_struct_t,Supv_Data.IO_Interface.GP_Interface[3].rCommand),
    offsetof(module_output_struct_t,Supv_Data.IO_Interface.GP_Interface[4].rCommand),
    offsetof(module_output_struct_t,Supv_Data.IO_Interface.GP_Interface[5].rCommand),
    offsetof(module_output_struct_t,Supv_Data.IO_Interface.GP_Interface[6].rCommand),
    offsetof(module_output_struct_t,Supv_Data.IO_Interface.GP_Interface[7].rCommand),
    offsetof(module_output_struct_t,Supv_Data.IO_Interface.GP_Interface[8].rCommand),
    offsetof(module_output_struct_t,Supv_Data.IO_Interface.GP_Interface[9].rCommand),
    offsetof(module_output_struct_t,Supv_Data.IO_Interface.GP_Interface[10].rCommand),
    offsetof(module_output_struct_t,Supv_Data.IO_Interface.GP_Interface[11].rCommand),
    offsetof(module output struct t,USR s OV.swTcmSpeedSetpoint),
    offsetof(module output struct t,USR s OV.uwTcmGPDriverControl),
```

```
    offsetof(module output struct t,USR s OV.uwTcmGPDriverControl),
    offsetof(module output struct t,USR s OV.uwTcmGPDriverControl),
    offsetof(module output struct t,USR s OV.uwTcmGPDriverControl),
    offsetof(module output struct t,USR s OV.uwTcmGPDriverControl),
    offsetof(module output struct t,USR s OV.swSteerCommandSetpoint1Deg100),
    offsetof(module output struct t,USR s OV.swSteerCommandSetpoint2Deg100),
    offsetof(module_output_struct_t,USR_s_OV.swHcmSpeedSetpoint),
    offsetof(module_output_struct_t, rGP2 Command),
    offsetof(module_output_struct_t, rGP8 Command),
    offsetof(module_output_struct_t, rGPL1_Command),
};
```

For example, when the above code snippet is compiled to assign values to each element of the table and the compiler reaches the following portion (e.g., the second to last line): offsetof(module_output_struct_t, rGP8_Command), it evaluates to a number corresponding to the offset of the variable rGP8_Command within the data structure type definition module_output_struct_t. In the example embodiment above, this member variable is the 25$^{th}$ variable (i.e., member #24) of the 26 member variables and, again assuming each member variable is allocated 4 bytes, then its offset is 24×4 which in hexadecimal is 0060h. Accordingly, its value in the module output offset table would evaluate to 0060h. Because of the data type specified for the module output offset table (i.e., uint16_t), each element of the module output offset table is considered to be an integer and can be used to calculate an address value, as discussed below.

Based on the assumptions discussed above with respect to the memory size allocated for each member variable and there being 26 module output variables, an example module output offset table that could be constructed by compiling the above code snippet is shown as TABLE 12 below:

| Module Output Offset Table (Offsets) | Element No. |
| --- | --- |
| 0000h | 0 |
| 0004h | 1 |
| 0008h | 2 |
| 000Ch | 3 |
| 0010h | 4 |
| 0014h | 5 |
| 0018h | 6 |
| 001Ch | 7 |
| 0020h | 8 |
| 0024h | 9 |
| 0028h | 10 |
| 002Ch | 11 |
| 0030h | 12 |
| 0034h | 13 |
| 0038h | 14 |
| 003Ch | 15 |
| 0040h | 16 |
| 0044h | 17 |
| 0048h | 18 |
| 004Ch | 19 |
| 0050h | 20 |
| 0054h | 21 |
| 0058h | 22 |
| 005Ch | 23 |
| 0060h | 24 |
| 0064h | 25 |

As mentioned, a module output offset table 728 is depicted in FIG. 7B and can be used as a substitute for the destination table 328 shown in FIG. 3B. As a result, substantially all of the steps of the flowchart of FIG. 5 can also be used with this second embodiment but the step 504 is modified. Each of the elements of the module output offset table 728 can be an offset or an offset amount of a corresponding member variable within sModule_Outputs data structure and, therefore, the module output offset table 728, also referred to herein as a module output table, comprises a superset of module output elements that are each an integer value. Element numbers 0-25 in the Module Output Offset Table correspond in the same order to the names of the module output variables in the code snippet above defining the "module_output_struct_t".

FIG. 8 is a flowchart of an example portion of an alternative method for linking VCM inputs/outputs with vehicle function inputs/outputs in accordance with the principles of the present invention. With respect to linking vehicle function outputs or output values with vehicle module output variables or memory locations, a module output data structure is created in memory, in step 802, that comprises a superset of module output variables or memory locations, wherein the superset of module output variables comprises a first subset of module output variables related to a first set of hardware devices provided on the first vehicle and a second subset of module output variables related to a second set of hardware devices provided on the second vehicle. In particular the data structure created can be a "struct" with each of its member variables corresponding to one of the module output variables. Next, in step 804, a module output offset table is created that comprises a set of output offset elements, wherein each output offset element corresponds to one of the superset of module output variables and comprises an offset amount of the corresponding module output variable within the module input data structure.

As described above with respect to the flowchart of FIG. 5, the routing engine begins in step 502 by reading the first entry of the routing table 324 and, based on the entry, determines, in step 504, a corresponding element in the destination table 328. Instead of performing step 504 in this manner, the algorithm of FIG. 8 uses the routing table entry as an index into the module output offset table 728 and determines, in step 806, a corresponding element in the module output offset table 728.

For example, if the routing engine 238 were in a VCM 200 operating on the first vehicle and is presently processing entry #5, then the routing engine 238 can extract AG_OUT_TCM_GP3_COMMAND from entry #5 of TABLE 10A and then use this extracted value as an index into the module output offset table 728. Based on the example "Index of Module Outputs" enumerated index defined above, AG_OUT_TCM_GP3_COMMAND corresponds to index #17. Accordingly, the routing engine, using the index, can retrieve element #17 from the module output offset table 728, i.e., the offset value 0044h.

In step 808, an address can be constructed using the sModule_Outputs data structure that is stored in memory. In particular, an address can be constructed that adds the offset value 0044h (i.e., suwAG_ModuleOutputOffsetArray[17]) with the address of the sModule_Outputs data structure variable (e.g. 04D00h) to arrive at an example address 04D44h. A transformed value can be linked or stored by the routing engine (in step 510) at this constructed composite address rather than the address retrieved from a destination table 328 to store the value associated with the module output variable USR_s_OV.uwTcmGPDriverControl.

Steps 506, 508, 512 and 514 of the flowchart of FIG. 5 are the same whether the destination table 328, or the module output offset table 728, is used to determine an address of a module output variable.

As one alternative to the vehicle function output table 320, wherein each vehicle function output element was a memory address for vehicle function output variables from the control software 234, a vehicle function output table 720 can be used wherein each vehicle function output element may be either a memory address as in table 320 or an offset. In a manner analogous to how the module output offset table was constructed with a respective offset value for the member variables of the module output data structure, the vehicle function output table 720 could be constructed so that each element is an offset amount. Thus, each vehicle function output element would be a respective offset amount associated with the member variables of a data structure that includes as its member variables the 10 vehicle function output variables whose addresses are referred to in TABLE 6 above.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A computer-based vehicle control module capable of operating on one of first and second materials handling vehicles comprising:
 a module input table comprising a superset of module input elements, wherein the superset of module input elements comprises a first subset of module input elements related to a first set of hardware devices provided on the first vehicle and a second subset of module input elements related to a second set of hardware devices provided on the second vehicle;
 at least one configuration table comprising respective configuration elements corresponding to ones of the superset of module input elements, wherein each respective configuration element comprises data related to effect a transformation of a value associated with the corresponding module input element of the module input table;
 vehicle function input elements related to vehicle function inputs utilized on the first vehicle and the second vehicle; and
 structure for determining a value associated with a module input element of the module input table corresponding to a vehicle function input element, transforming the value to a transformed value and linking the transformed value with the corresponding vehicle function input element.

2. The vehicle control module of claim 1, wherein the structure comprises:
 a routing table comprising entries related to:
  a) associated vehicle function input elements, and
  b) associated module input elements of one of the first and second subsets of module input elements corresponding to one of the first and the second vehicle on which the vehicle control module is operating; and
 wherein:
  determining the value associated with a module input element comprises:
   a) determining the module input element associated with the vehicle function input element that is associated with the entry, and
   b) determining the value associated with the corresponding module input element of the module input table.

3. The vehicle control module of claim 1, comprising a computer accessible memory wherein each element of the module input table comprises a respective address in the memory where its associated value is stored.

4. The vehicle control module of claim 1, comprising:
 a module input data structure comprising a superset of module input variables, wherein the superset of module input variables comprises a first subset of module input variables related to the first set of hardware devices provided on the first vehicle and a second subset of module input variables related to the second set of hardware devices provided on the second vehicle; and
 wherein each module input element corresponds to one of the superset of module input variables and comprises an offset amount of the corresponding module input variable within the module input data structure.

5. The vehicle control module of claim 4, wherein the structure comprises:
 a routing table comprising entries related to:
  a) associated vehicle function input elements, and
  b) associated module input elements of one of the first and second subsets of module input elements corresponding to one of the first and the second vehicle on which the vehicle control module is operating; and
 wherein:
  determining the value associated with a module input element comprises:
   a) determining the module input element associated with the vehicle function input element that is associated with the entry,
   b) determining an address of the module input data structure,
   c) constructing a composite address based on the module input element and the address of the module input data structure, and
   d) determining a value associated with the composite address.

6. The vehicle control module of claim 1, wherein the at least one configuration table comprises:
 a module input configuration table comprising respective module input configuration elements corresponding to ones of the superset of module input elements, wherein each respective module input configuration element comprises data to effect a first transformation related to the value associated with the corresponding module input element of the module input table.

7. The vehicle control module of claim 6, wherein the at least one configuration table further comprises:
 a function input configuration table comprising respective function input configuration elements corresponding to ones of the vehicle function input elements, wherein each respective function input configuration element comprises data to effect a second transformation related to the value associated with the corresponding module input element of the module input table.

8. The vehicle control module of claim 7, wherein transforming the value to the transformed value comprises:
determining the transformed value based on the first transformation and the second transformation.

9. The vehicle control module of claim 1, comprising a computer accessible memory wherein each vehicle function input element comprises a respective address in the memory where its associated transformed value is stored.

10. The vehicle control module of claim 1, wherein the transformation of the value comprises one or more of: leave the value unchanged; bitmask the value; bit-shift the value; add a predetermined offset to the value; or multiply the value by a predetermined gain.

11. The vehicle control module of claim 7, wherein each element of the module input configuration table comprises data related to a data type of the value associated with the corresponding module input element of the module input table.

12. The vehicle control module of claim 11, wherein each element of the function input configuration table comprises data related to a different data type associated with the corresponding vehicle function input element and the transforming the value comprises changing the data type to the different data type.

13. The vehicle control module of claim 1, wherein the hardware devices implemented on the one of the first and the second vehicles comprise one or more of: a bus of a vehicle network; an encoder; a switch; an analog sensor; or a digital sensor.

14. The vehicle control module of claim 1, wherein at least one module input element of the superset of module input elements is a member of both the first subset of module input elements and the second subset of module input elements.

15. The vehicle control module of claim 1, wherein at least one module input element of the superset of module input elements is a member of only one of the first subset of module input elements or the second subset of module input elements.

16. The vehicle control module of claim 4, wherein at least one module input variable of the superset of module input variables is a member of both the first subset of module input variables and the second subset of module input variables.

17. The vehicle control module of claim 4, wherein at least one module input variable of the superset of module input variables is a member of only one of the first subset of module input variables or the second subset of module input variables.

18. A method for a vehicle control module capable of operating on one of first and second materials handling vehicles, comprising:
providing, by the vehicle control module, a module input table comprising a superset of module input elements, wherein the superset of module input elements comprises a first subset of module input elements related to a first set of hardware devices provided on the first vehicle and a second subset of module input elements related to a second set of hardware devices provided on the second vehicle;
providing, by the vehicle control module, at least one configuration table comprising respective configuration elements corresponding to ones of the superset of module input elements, wherein each respective configuration element comprises data related to effect a transformation of a value associated with the corresponding module input element of the module input table;
providing, by the vehicle control module, vehicle function input elements related to vehicle function inputs utilized on the first vehicle and the second vehicle;
determining, by the vehicle control module, a value associated with a module input element of the module input table corresponding to a vehicle function input element;
transforming, by the vehicle control module, the value to a transformed value; and
linking, by the vehicle control module, the transformed value with the corresponding vehicle function input element.

19. The method of claim 18, comprising:
providing, by the vehicle control module, a routing table comprising entries related to:
a) associated vehicle function input elements, and
b) associated module input elements of one of the first and second subsets of module input elements corresponding to one of the first and the second vehicle on which the vehicle control module is operating; and wherein:
determining the value associated with a module input element comprises:
a) determining the module input element associated with the vehicle function input element that is associated with the entry, and
b) determining the value associated with the corresponding module input element of the module input table.

20. The method of claim 18, wherein each module input element of the module input table comprises a respective address in a memory where its associated value is stored.

21. The method of claim 18, comprising:
providing, by the vehicle control module, a module input data structure comprising a superset of module input variables, wherein the superset of module input variables comprises a first subset of module input variables related to the first set of hardware devices provided on the first vehicle and a second subset of module input variables related to the second set of hardware devices provided on the second vehicle; and wherein each module input element corresponds to one of the superset of module input variables and comprises an offset amount of the corresponding module input variable within the module input data structure.

22. The method of claim 21, comprising:
providing, by the vehicle control module, a routing table comprising entries related to:
a) associated vehicle function input elements, and
b) associated module input elements of one of the first and second subsets of module input elements corresponding to one of the first and the second vehicle on which the vehicle control module is operating; and wherein:
determining the value associated with a module input element comprises:
a) determining the module input element associated with the vehicle function input element that is associated with the entry,
b) determining an address of the module input data structure,
c) constructing a composite address based on the module input element and the address of the module input data structure, and d) determining a value associated with the composite address.

23. The method of claim 18, wherein the at least one configuration table comprises:
a module input configuration table comprising respective module input configuration elements corresponding to ones of the superset of module input elements, wherein each respective module input configuration element comprises data to effect a first transformation related to the value associated with the corresponding module input element of the module input table.

24. The method of claim 23, wherein the at least one configuration table comprises: a function input configuration table comprising respective function input configuration elements corresponding to ones of the vehicle function input elements, wherein each respective function input configuration element comprises data to effect a second transformation related to the value associated with the corresponding module input element of the module input table.

25. The method of claim 24, wherein transforming the value to the transformed value comprises:
determining the transformed value based on the first transformation and the second transformation.

26. The method of claim 18, wherein each vehicle function input element comprises a respective address in a memory where its associated transformed value is stored.

27. The method of claim 18, wherein transforming the value comprises one or more of: leaving the value unchanged; bit masking the value; bit-shifting the value; adding a predetermined offset to the value; or multiplying the value by a predetermined gain.

28. The method of claim 24, wherein each element of the module input configuration table comprises data related to a data type of the value associated with the corresponding module input element of the module input table.

29. The method of claim 28, wherein each element of the function input configuration table comprises data related to a different data type associated with the corresponding vehicle function input element and the transforming the value comprises changing the data type to the different data type.

30. The method of claim 18, wherein the hardware devices implemented on the one of the first and the second vehicles comprise one or more of: a bus of a vehicle network; an encoder; a switch; an analog sensor; or a digital sensor.

31. The method of claim 18, wherein at least one module input element of the superset of module input elements is a member of both the first subset of module input elements and the second subset of module input elements.

32. The method of claim 18, wherein at least one module input element of the superset of module input elements is a member of only one of the first subset of module input elements or the second subset of module input elements.

33. The method of claim 21, wherein at least one module input variable of the superset of module input variables is a member of both the first subset of module input variables and the second subset of module input variables.

34. The method of claim 21, wherein at least one module input variable of the superset of module input variables is a member of only one of the first subset of module input variables or the second subset of module input variables.

35. A computer-based vehicle control module capable of operating on one of first and second materials handling vehicles comprising:
a source table comprising a first superset of source elements, wherein the first superset of source elements comprises a first subset of source elements related to a first set of hardware devices provided on the first vehicle and a second subset of source elements related to a second set of hardware devices provided on the second vehicle; at least one configuration table comprising respective configuration elements corresponding to ones of the first superset of source elements, wherein each respective configuration element comprises data related to effect a transformation of a value associated with the corresponding source element of the source table;
a vehicle function input table comprising a set of vehicle function input elements related to vehicle function inputs utilized on the first vehicle and the second vehicle; and
structure comprising a routing table and routing engine for determining a value of a source element of the source table corresponding to a vehicle function input element of the vehicle function input table, transforming the value to a transformed value and linking the transformed value with the corresponding vehicle function input element.

36. The vehicle control module of claim 35, wherein the at least one configuration table comprises: a module input configuration table comprising respective module input configuration elements corresponding to ones of the first superset of source elements, wherein each respective module input configuration element comprises data to effect a first transformation related to the value associated with the corresponding source element of the source table.

37. The vehicle control module of claim 36, wherein the at least one configuration table further comprises: a function input configuration table comprising respective function input configuration elements corresponding to ones of the vehicle function input elements, wherein each respective function input configuration element comprises data to effect a second transformation related to the value associated with the corresponding source element of the source table.

38. The vehicle control module of claim 37, wherein transforming the value to the transformed value comprises:
determining the transformed value based on the first transformation and the second transformation.

39. The vehicle control module of claim 35, wherein the structure comprises:
the routing table comprising entries related to:
  a) associated vehicle function input elements, and
  b) associated source elements of one of the first and second subsets of source elements corresponding to one of the first and the second vehicle on which the vehicle control module is operating; and
the routing engine, that when executed on the one of the first and second vehicles, is configured, for each entry of the routing table, to:
  a) determine the source element associated with the vehicle function input element that is associated with the entry,
  b) determine a respective configuration element of each of first and second configuration tables corresponding to the associated source element,
  c) determine the value associated with the corresponding source element of the source table, and
  d) based on the corresponding respective configuration elements, transform the value to the transformed value, which is linked to the vehicle function input element associated with the entry.

40. The vehicle control module of claim 39, wherein:
the first superset further comprises a third subset of source elements related to one or more default values; the routing table further comprises one or more entries related to:
  a) associated vehicle function input elements, and
  b) associated source elements of the third subset; and
the routing engine, when executed on the one of the first and second vehicles, is further configured, for each entry of the routing table related to the third subset of source elements, to:
  a) determine the source element associated with the vehicle function input element that is associated with the entry,
  b) determine a respective configuration element of each of the first and second configuration tables corresponding to the associated source element,
  c) determine the value associated with the corresponding source element of the source table, and
  d) based on the corresponding respective configuration elements, transform the value to the transformed value, which is linked to the vehicle function input element associated with the entry.

41. The vehicle control module of claim 39, wherein the number of entries of the routing table equals the number of elements of the vehicle function input table.

42. The vehicle control module of claim 35, comprising a computer accessible memory wherein each element of the source table comprises a respective address in the memory where its associated value is stored.

43. The vehicle control module of claim 35, comprising a computer accessible memory wherein each element of the vehicle function input table comprises a respective address in the memory where its associated transformed value is stored.

44. The vehicle control module of claim 35, wherein the transformation of the value comprises one or more of: leave the value unchanged; bitmask the value; bit-shift the value; add a predetermined offset to the value; or multiply the value by a predetermined gain.

45. The vehicle control module of claim 37, wherein each element of the module input configuration table comprises data related to a data type of the value associated with the corresponding element of the source table.

46. The vehicle control module of claim 45, wherein each element of the function input configuration table comprises data related to a different data type associated with the corresponding element of the vehicle function input table and the transforming the value comprises changing the data type to the different data type.

47. The vehicle control module of claim 35, wherein the hardware devices implemented on the one of the first and the second vehicles comprise one or more of: a bus of a vehicle network; an encoder; a switch; an analog sensor; or a digital sensor.

48. The vehicle control module of claim 35, wherein at least one element of the first superset of source elements is a member of both the first subset of source elements and the second subset of source elements.

49. The vehicle control module of claim 35, wherein at least one element of the first superset of source elements is a member of only one of the first subset of source elements or the second subset of source elements.

50. A method for a vehicle control module capable of operating on one of first and second materials handling vehicles, comprising:
providing, by the vehicle control module, a source table comprising a first superset of source elements, wherein the first superset of source elements comprises a first subset of source elements related to a first set of hardware devices provided on the first vehicle and a second subset of source elements related to a second set of hardware devices provided on the second vehicle;
providing, by the vehicle control module, at least one configuration table comprising respective configuration elements corresponding to ones of the first superset of source elements, wherein each respective configuration element comprises data related to effect a transformation of a value associated with the corresponding source element of the source table;
providing, by the vehicle control module, a vehicle function input table comprising a set of vehicle function input elements related to vehicle function inputs utilized on the first vehicle and the second vehicle;
determining, by the vehicle control module, a value of a source element of the source table corresponding to a vehicle function input element of the vehicle function input table;
transforming, by the vehicle control module, the value to a transformed value; and
linking, by the vehicle control module, the transformed value with the corresponding vehicle function input element.

51. The method of claim 50, wherein the at least one configuration table comprises:
a module input configuration table comprising respective module input configuration elements corresponding to ones of the first superset of source elements, wherein each respective module input configuration element comprises data to effect a first transformation related to the value associated with the corresponding source element of the source table.

52. The method of claim 51, wherein the at least one configuration table comprises:
a function input configuration table comprising respective function input configuration elements corresponding to ones of the vehicle function input elements, wherein each respective function input configuration element comprises data to effect a second transformation related to the value associated with the corresponding source element of the source table.

53. The method of claim 52, wherein transforming the value to the transformed value comprises:
determining the transformed value based on the first transformation and the second transformation.

54. The method of claim 50, comprising:
providing, by the vehicle control module, a routing table comprising entries related to:
  a) associated vehicle function input elements, and
  b) associated source elements of one of the first and second subsets of source elements corresponding to one of the first and the second vehicle on which the vehicle control module is operating; and wherein:
determining the value of a source element comprises:
  a) determining the source element associated with the vehicle function input element that is associated with the entry, and
  b) determining the value associated with the corresponding source element of the source table, and
transforming the value to the transformed value comprises:

a) determining a respective configuration element of each of first and second configuration tables corresponding to the associated source element, and
b) based on the corresponding respective configuration elements, transforming the value to the transformed value, which is linked to the vehicle function input element associated with the entry.

55. The method of claim 54, wherein:
the first superset further comprises a third subset of source elements related to one or more default values;
the routing table further comprises one or more entries related to:
a) associated vehicle function input elements, and
b) associated source elements of the third subset; and
for each entry of the routing table related to the third subset of source elements:
a) determining the source element associated with the vehicle function input element that is associated with the entry,
b) determining a respective configuration element of each of the first and second configuration tables corresponding to the associated source element,
c) determining the value associated with the corresponding source element of the source table, and
d) based on the corresponding respective configuration elements, transforming the value to the transformed value, which is linked to the vehicle function input element associated with the entry.

56. The method of claim 54, wherein the number of entries of the routing table equals the number of elements of the vehicle function input table.

57. The method of claim 50, wherein each element of the source table comprises a respective address in a memory where its associated value is stored.

58. The method of claim 50, wherein each element of the vehicle function input table comprises a respective address in a memory where its associated transformed value is stored.

59. The method of claim 50, wherein transforming the value comprises one or more of: leaving the value unchanged; bit masking the value; bit-shifting the value; adding a predetermined offset to the value; or multiplying the value by a predetermined gain.

60. The method of claim 52, wherein each element of the module input configuration table comprises data related to a data type of the value associated with the corresponding element of the source table.

61. The method of claim 60, wherein each element of the function input configuration table comprises data related to a different data type associated with the corresponding element of the vehicle function input table and the transforming the value comprises changing the data type to the different data type.

62. The method of claim 50, wherein the hardware devices implemented on the one of the first and the second vehicles comprise one or more of: a bus of a vehicle network; an encoder; a switch; an analog sensor; or a digital sensor.

63. The method of claim 50, wherein at least one element of the first superset of source elements is a member of both the first subset of source elements and the second subset of source elements.

64. The method of claim 50, wherein at least one element of the first superset of source elements is a member of only one of the first subset of source elements or the second subset of source elements.

65. A computer-based vehicle control module capable of operating on one of first and second materials handling vehicles comprising:
a source table comprising a first superset of source elements, wherein the first superset of source elements comprises a first subset of source elements related to a first set of hardware devices provided on the first vehicle and a second subset of source elements related to a second set of hardware devices provided on the second vehicle;
a module input configuration table comprising respective module input configuration elements corresponding to ones of the first superset of source elements, wherein each respective module input configuration element comprises data related to effect a transformation of a value associated with the corresponding source element of the source table;
a vehicle function input table comprising a set of vehicle function input elements related to vehicle function inputs utilized on the first vehicle and the second vehicle;
a routing table comprising entries related to:
a) associated vehicle function input elements, and
b) associated source elements of one of the first and second subsets of source elements corresponding to one of the first and the second vehicle on which the vehicle control module is operating; and
a routing engine, that when executed on the one of the first and second vehicles, is configured, for each entry of the routing table, to:
a) determine the source element associated with the vehicle function input element that is associated with the entry,
b) determine the module input configuration element of the module input configuration table corresponding to the associated source element,
c) determine the value associated with the corresponding source element of the source table, and
d) based on the corresponding module input configuration element, transform the value to a transformed value.

66. The vehicle control module of claim 65, comprising:
a function input configuration table comprising respective function input configuration elements corresponding to ones of the vehicle function input elements, wherein each respective function input configuration element comprises data related to effect a further transformation of the transformed value associated with the corresponding source element of the source table; and
wherein:
the routing engine, that when executed on the one of the first and second vehicles, is further configured, for each entry of the routing table, to:
e) based on the corresponding function input configuration element, further transform the transformed value to a further transformed value; and
f) link the further transformed value with the vehicle function input element associated with the entry.

67. The vehicle control module of claim 65, wherein the number of entries of the routing table equals the number of elements of the vehicle function input table.

68. The vehicle control module of claim 65, comprising a computer accessible memory and wherein: each element of the source table comprises a respective address in the memory where its associated value is stored.

69. The vehicle control module of claim 65, comprising a computer accessible memory wherein: each element of the vehicle function input table comprises a respective address in the memory where its associated transformed value is stored.

70. The vehicle control module of claim 65, wherein the transformation of the value comprises one or more of: leave the value unchanged; bitmask the value; bit-shift the value; add a predetermined offset to the value; or multiply the value by a predetermined gain.

71. The vehicle control module of claim 65, wherein at least one element of the first superset of source elements is a member of both the first subset of source elements and the second subset of source elements.

72. The vehicle control module of claim 65, wherein at least one element of the first superset of source elements is a member of only one of the first subset of source elements or the second subset of source elements.

* * * * *